US012812440B2

(12) United States Patent
Lee et al.

(10) Patent No.: US 12,812,440 B2
(45) Date of Patent: Nov. 24, 2026

(54) CSI COMPUTATION TIME

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/793,658

(22) Filed: Aug. 2, 2024

(65) Prior Publication Data

US 2025/0063415 A1 Feb. 20, 2025

Related U.S. Application Data

(60) Provisional application No. 63/534,019, filed on Aug. 22, 2023, provisional application No. 63/533,549, filed on Aug. 18, 2023.

(51) Int. Cl.

| | |
|---|---|
| ***H04W 24/10*** | (2009.01) |
| ***H04L 5/00*** | (2006.01) |

(Continued)

(52) U.S. Cl.

CPC ........... *H04W 24/10* (2013.01); *H04L 5/0048* (2013.01); *H04L 5/0053* (2013.01); *H04W 72/232* (2023.01); *H04W 72/51* (2023.01)

(58) Field of Classification Search

CPC .... H04L 5/0048; H04L 5/0053; H04W 24/10; H04W 72/51; H04W 72/232

See application file for complete search history.

(56) References Cited

U.S. PATENT DOCUMENTS 10,659,118 B2 5/2020 Rahman et al.
11,606,128 B2 * 3/2023 Lee ...................... H04B 7/0626

(Continued)

OTHER PUBLICATIONS

International Search Report and Written Opinion issued Nov. 29, 2024 regarding International Application No. PCT/KR2024/012201, 6 pages.

(Continued)

*Primary Examiner* — Melanie Jagannathan

(57) ABSTRACT

Apparatuses and methods for channel state information (CSI) computation time. A method performed by a user equipment (UE) includes receiving a configuration about a CSI report; based on the configuration, determining the CSI report; and transmitting the CSI report. The CSI report starts no earlier than at a symbol Z and at a symbol Z'. The symbol Z is a next uplink symbol with a cyclic prefix (CP) starting $T_{proc,CSI}=Z(2048+144)\cdot\kappa 2^{-\mu}\cdot T_c$ after an end of a last symbol of a downlink control information triggering the CSI report. The symbol Z' is a next uplink symbol with a CP starting $T'_{proc,CSI}=Z(2048+144)\cdot k2^{-\mu}\cdot T_c$ after an end of a last symbol in time of a latest of channel and interference measurements associated with the CSI report. (Z, Z') is ($Z_2$+w, $Z'_2$) or ($Z_2$+w+$Z'_2$, $2Z'_2$) according to a UE capability. ($Z_2$, $Z'_2$) is according to a table; w depends on a periodicity of a periodic or semi-persistent CSI-reference signal resource.

20 Claims, 14 Drawing Sheets

(51) Int. Cl.
*H04W 72/232* (2023.01)
*H04W 72/51* (2023.01)

(56) References Cited

U.S. PATENT DOCUMENTS

| | | | | |
|---|---|---|---|---|
| 12,538,297 | B2 * | 1/2026 | Yi | H04B 7/063 |
| 2023/0111064 | A1 | 4/2023 | Rahman et al. | |
| 2023/0208489 | A1 * | 6/2023 | Bhamri | H04B 7/0626 370/329 |
| 2023/0209386 | A1 * | 6/2023 | Khoshkholgh Dashtaki | H04W 24/10 370/350 |
| 2023/0232267 | A1 * | 7/2023 | Yang | H04B 17/345 370/252 |
| 2024/0380460 | A1 * | 11/2024 | Go | H04B 7/0626 |
| 2025/0016593 | A1 * | 1/2025 | Narayanan | H04L 25/0254 |
| 2026/0059439 | A1 * | 2/2026 | Khoshkholgh Dashtaki | H04W 48/20 |
| 2026/0059545 | A1 * | 2/2026 | Khoshkholgh Dashtaki | H04W 72/232 |

OTHER PUBLICATIONS

"3rd Generation Partnership Project; Technical Specification Group Radio Access Network; NR; Physical layer procedures for data (Release 17)", 3GPP TS 38.214 V17.6.0, Jun. 2023, 231 pages.

Lenovo, "CSI enhancements for high mobility and coherent JT", 3GPP TSG RAN WG1 #114, R1-2306933, Aug. 2023, 9 pages.

MediaTek Inc., "CSI enhancement", 3GPP TSG RAN WG1 #114, R1-2308064, Aug. 2003, 7 pages.

"3rd Generation Partnership Project; Technical Specification Group Radio Access Network; Evolved Universal Terrestrial Radio Access (E-UTRA); Physical channels and modulation (Release 17)", 3GPP TS 36.211 V17.2.0, Jun. 2022, 250 pages.

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"LTE; Evolved Universal Terrestrial Radio Access (E-UTRA); Physical layer procedures (3GPP TS 36.213 version 17.4.0 Release 17)", ETSI TS 136 213 V17.4.0, Jan. 2023, 568 pages.

"LTE; Evolved Universal Terrestrial Radio Access (E-UTRA); Medium Access Control (MAC) protocol specification (3GPP TS 36.321 version 17.3.0 Release 17)", ETSI TS 136 321 V17.3.0, Jan. 2023, 148 pages.

"LTE; Evolved Universal Terrestrial Radio Access (E-UTRA); Radio Resource Control (RRC); Protocol specification (3GPP TS 36.331 version 17.3.0 Release 17)", ETSI TS 136 331 V17.3.0, Jan. 2023, 1140 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for data (3GPP TS 38.214 version 17.4.0 Release 17)", ETSI TS 138 214 V17.4.0, Jan. 2023, 236 pages.

Fraunhofer IIS et al., "Measurement results on Doppler spectrum for various UE mobility environments and related CSI enhancements", 3GPP TSG RAN WG#86, RP-192978, Dec. 2019, 13 pages.

"5G; NR; Physical channels and modulation (3GPP TS 38.211 version 17.4.0 Release 17)", ETSI TS 138 211 V17.4.0, Jan. 2023, 141 pages.

"5G; NR; Physical layer procedures for control (3GPP TS 38.213 version 17.4.0 Release 17)", ETSI TS 138 213 V17.4.0, Jan. 2023, 263 pages.

"5G; NR; User Equipment (UE) radio access capabilities (3GPP TS 38.306 version 17.4.0 Release 17)", ETSI TS 138 306 V17.4.0, Jul. 2023, 255 pages.

* cited by examiner

CSI COMPUTATION TIME

CROSS-REFERENCE TO RELATED AND CLAIM OF PRIORITY

The present application claims priority under 35 U.S.C. § 119(e) to U.S. Provisional Patent Application No. 63/533,549 filed on Aug. 18, 2023, and U.S. Provisional Patent Application No. 63/534,019 filed on Aug. 22, 2023, which are hereby incorporated by reference in their entirety.

TECHNICAL FIELD

The present disclosure relates generally to wireless communication systems and, more specifically, the present disclosure is related to apparatuses and methods for channel state information (CSI) computation time.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to CSI computation time.

In one embodiment, a user equipment (UE) is provided. The UE includes a transceiver configured to receive a configuration about a CSI report and a processor operably coupled to the transceiver. The processor, based on the configuration, is configured to determine the CSI report. The CSI report starts no earlier than at a symbol Z and at a symbol Z'. The symbol Z is a next uplink symbol with a cyclic prefix (CP) starting $T_{proc,CSI}=Z(2048+144)\cdot\kappa 2^{-\mu}\cdot T_c$ after an end of a last symbol of a downlink control information (DCI) triggering the CSI report. The symbol Z' is a next uplink symbol with a CP starting $$T'_{proc,CSI} = Z(2048+144)\cdot\kappa 2^{-\mu}\cdot T_c$$

after an end of a last symbol in time of a latest of channel and interference measurements associated with the CSI report.

$$(Z, Z') \text{ is } (Z_2 + w, Z'_2) \text{ or } (Z_2 + w + Z'_2, 2Z'_2)$$

according to a UE capability.

$$(Z_2, Z'_2)$$

is according to a table; w depends on p, which is a periodicity of a periodic or semi-persistent CSI-reference signal (RS) resource. The transceiver is further configured to transmit the CSI report.

In another embodiment, a base station (BS) is provided. The BS includes a processor and a transceiver operably coupled to the processor. The transceiver is configured to transmit a configuration about a CSI report and receive the CSI report. The CSI report starts no earlier than at a symbol Z and at a symbol Z'. The symbol Z is a next uplink symbol with a CP starting $T_{proc,CSI}=Z(2048+144)\cdot\kappa 2^{-\mu}\cdot T_c$ after an end of a last symbol of a downlink control information (DCI) triggering the CSI report. The symbol Z' is a next uplink symbol with a CP starting $$T'_{proc,CSI} = Z(2048+144)\cdot\kappa 2^{-\mu}\cdot T_c$$

after an end of a last symbol in time of a latest of channel and interference measurements associated with the CSI report.

$$(Z, Z') \text{ is } (Z_2 + w, Z'_2) \text{ or } (Z_2 + w + Z'_2, 2Z'_2)$$

according to a UE capability.

$$(Z_2, Z'_2)$$

is according to a table; w depends on p, which is a periodicity of a periodic or semi-persistent CSI-RS resource.

In yet another embodiment, a method performed by a UE is provided. The method includes receiving a configuration about a CSI report; based on the configuration, determining the CSI report; and transmitting the CSI report. The CSI report starts no earlier than at a symbol Z and at a symbol Z'. The symbol Z is a next uplink symbol with a CP starting $T_{proc,CSI}=Z(2048+144)\cdot\kappa 2^{-\mu}\cdot T_c$ after an end of a last symbol of a DCI triggering the CSI report. The symbol Z' is a next uplink symbol with a CP starting $$T'_{proc,CSI} = Z(2048+144)\cdot\kappa 2^{-\mu}\cdot T_c$$

after an end of a last symbol in time of a latest of channel and interference measurements associated with the CSI report.

$$(Z, Z') \text{ is } (Z_2 + w, Z_2') \text{ or } (Z_2 + w + Z_2', 2Z_2')$$

according to a UE capability.

$$(Z_2, Z_2')$$

is according to a table; w depends on p, which is a periodicity of a periodic or semi-persistent CSI-RS resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
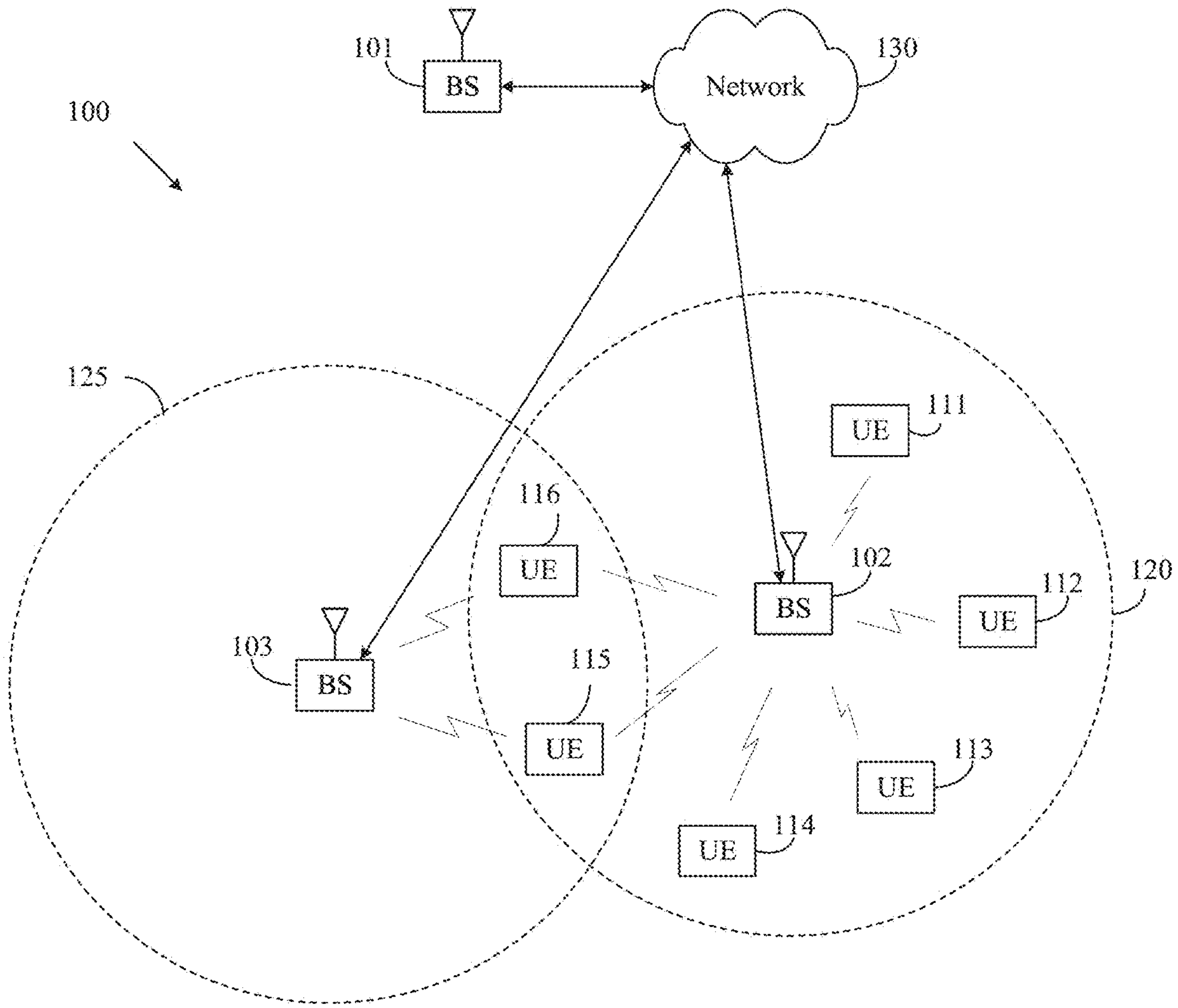
FIG. 1 illustrates an example wireless network according to embodiments of the present disclosure.

FIGS. 1-19 discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1]3GPP TS 36.211 v17.2.0, "E-UTRA, Physical channels and modulation;" [2]3GPP TS 36.212 v17.1.0, "E-UTRA, Multiplexing and Channel coding;" [3]3GPP TS 36.213 v17.4.0, "E-UTRA, Physical Layer Procedures;" [4]3GPP TS 36.321 v17.3.0, "E-UTRA, Medium Access Control (MAC) protocol specification;" [5]3GPP TS 36.331 v17.3.0, "E-UTRA, Radio Resource Control (RRC) Protocol Specification;" [6]3GPP TR 22.891 v1.2.0; [7]3GPP TS 38.212 v17.4.0, "E-UTRA, NR, Multiplexing and Channel coding;" [8]3GPP TS 38.214 v17.4.0, "E-UTRA, NR, Physical layer procedures for data;" [9] RP-192978, "Measurement results on Doppler spectrum for various UE mobility environments and related CSI enhancements," Fraunhofer IIS, Fraunhofer HHI, Deutsche Telekom; [10]3GPP TS 38.211 v17.4.0, "E-UTRA, NR, Physical channels and modulation;" [11]3GPP TS 38.213 v17.4.0, "E-UTRA, NR, Physical layer procedures for control;" and [12]3GPP TS 38.306 v17.4.0, "E-UTRA, NR, User Equipment (UE) radio access capabilities."

Figure 2:
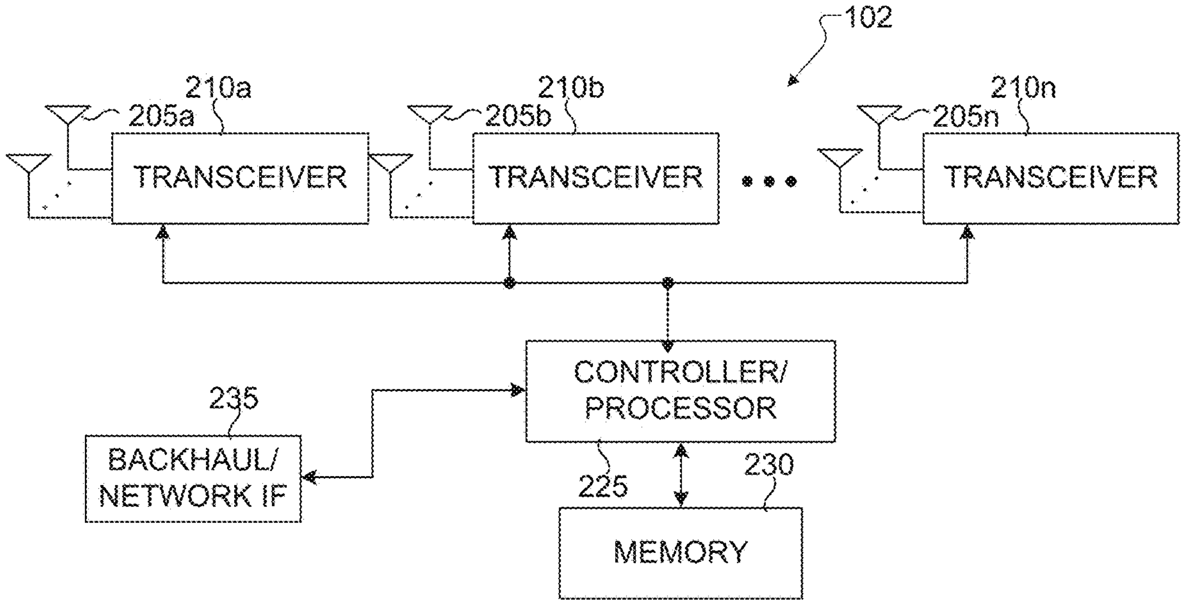
FIG. 2 illustrates an example gNodeB (gNB) according to embodiments of the present disclosure.
Figure 3:
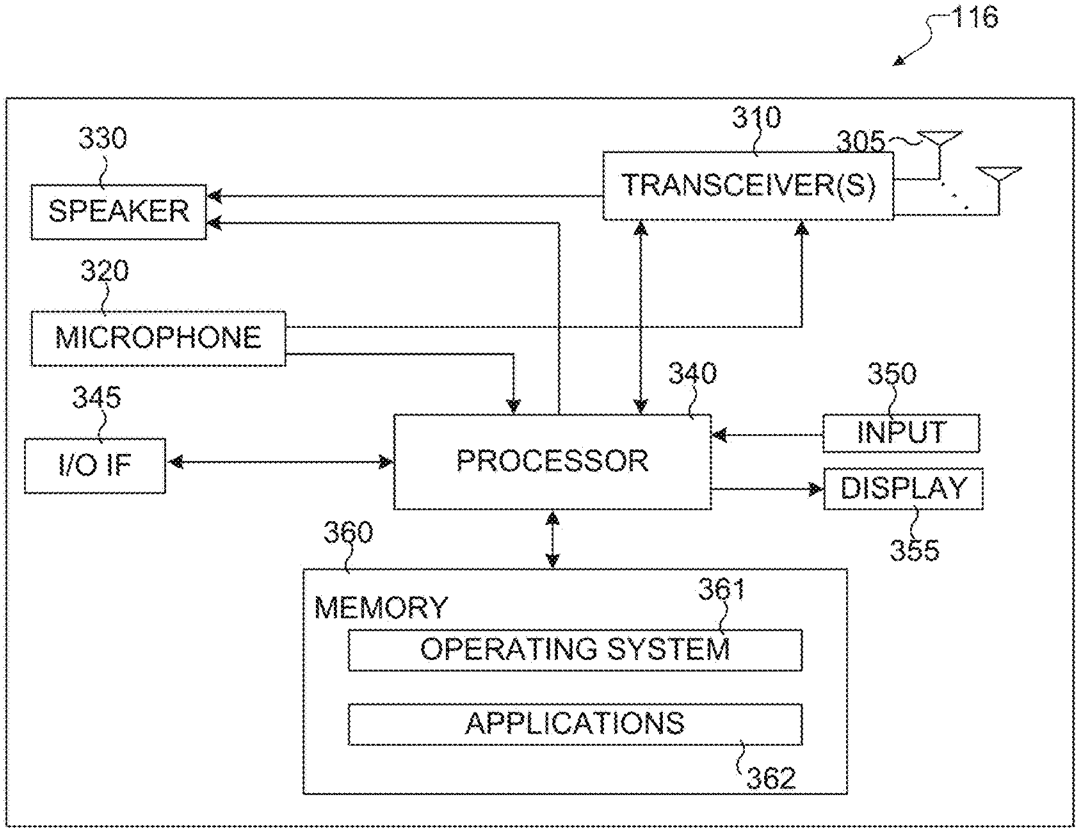
FIG. 3 illustrates an example UE according to embodiments of the present disclosure.

FIGS. 1-28 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of the present disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for CSI computation time. In certain embodiments, one or more of the BSs 101-103 include circuitry, programing, or a combination thereof to support CSI computation time.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for CSI computation time. Any of a wide variety of other functions could be supported in the gNB 102 by the controller/processor 225.

The controller/processor 225 is also capable of executing programs and other processes resident in the memory 230, such as processes to support CSI computation time. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for CSI computation time as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
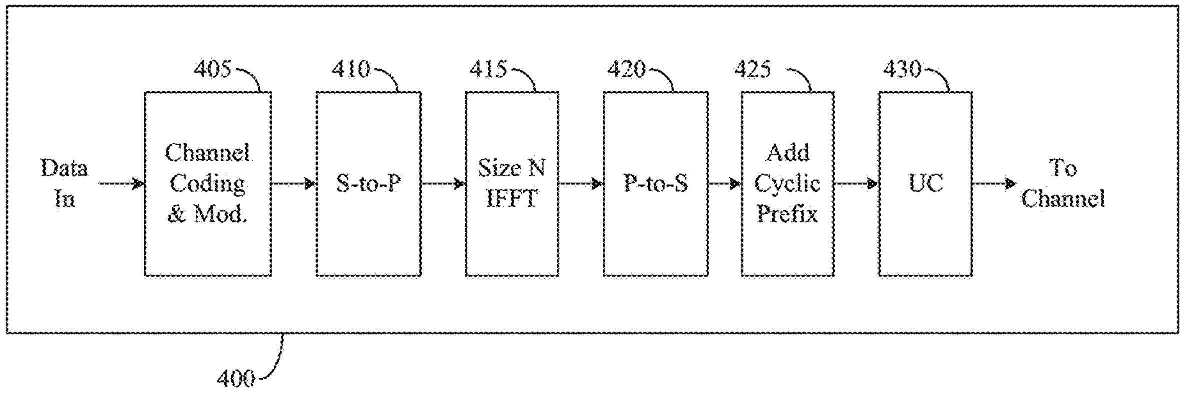
FIGS. 4A and 4B illustrate an example of a wireless transmit and receive paths according to embodiments of the present disclosure.
Figure 4B:
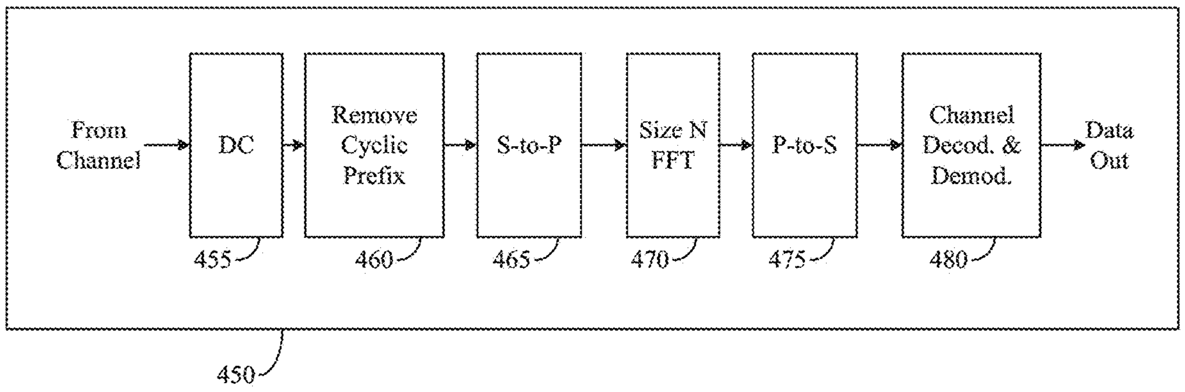

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 and/or the receive path 450 is configured to support CSI computation time as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB and the UE. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
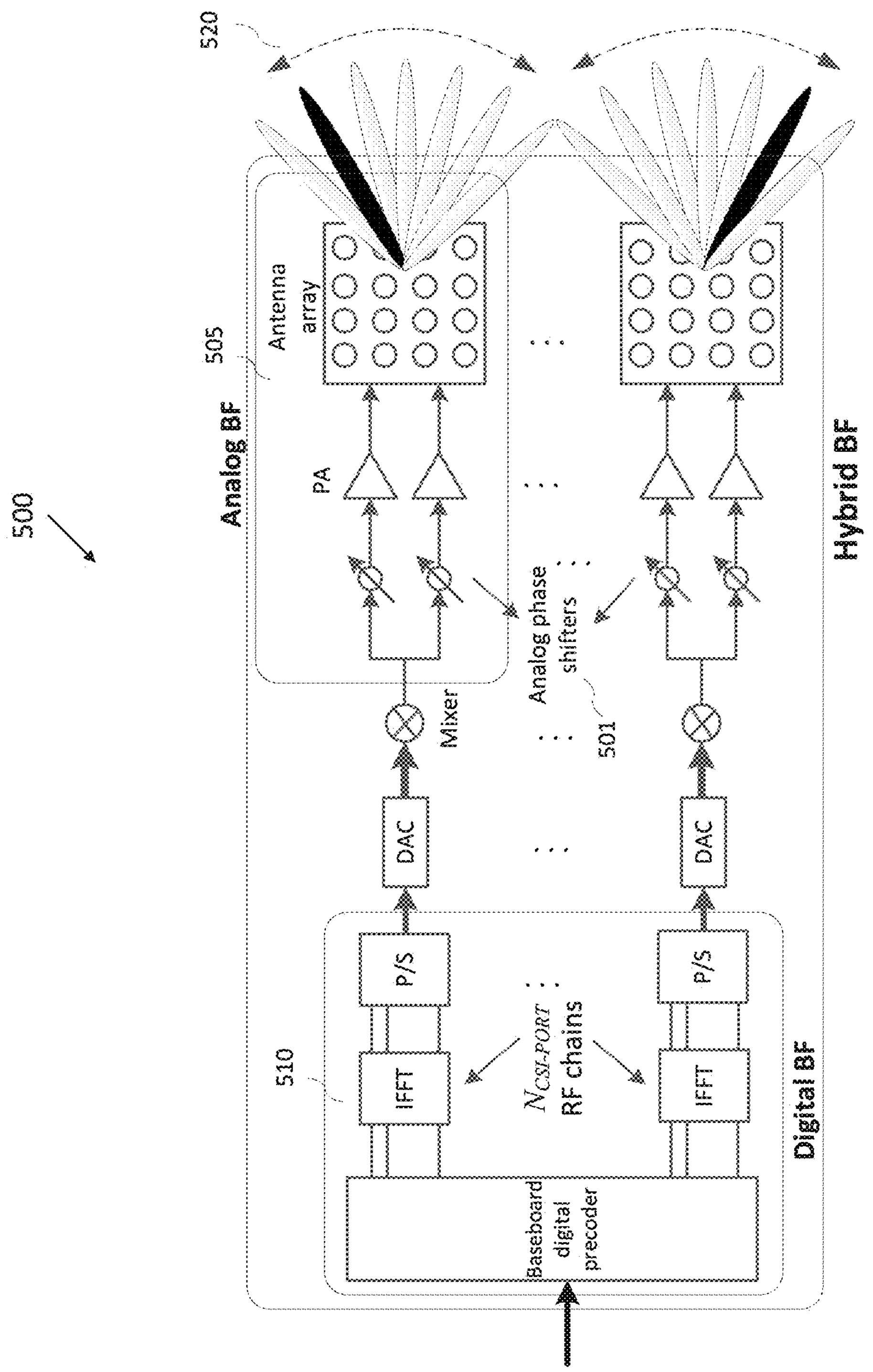
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports NCS-PORT. A digital beamforming unit 510 performs a linear combination across NCSI-PORT analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are essential to compensate for the additional path loss.

In next generation cellular systems, various use cases are envisioned beyond the capabilities of LTE. Termed 5G or the fifth generation cellular system, a system capable of operating at sub-6 GHz and above-6 GHz (for example, in mmWave regime) becomes one of the requirements. In 3GPP TR 22.891 (REF6), 74 5G use cases has been identified and described; those use cases can be roughly categorized into three different groups. A first group is termed 'enhanced mobile broadband' (eMBB), targeted to high data rate services with less stringent latency and reliability requirements. A second group is termed 'ultra-reliable and low latency' (URLL) targeted for applications with less stringent data rate requirements, but less tolerant to latency. A third group is termed 'massive MTC' (mMTC) targeted for large number of low-power device connections such as 1 million per $km^2$ with less stringent the reliability, data rate, and latency requirements.

The 3GPP specification (such as 4G LTE and 5G NR) supports up to 32 CSI-RS antenna ports which enable an eNB (or gNB) to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

To enable digital precoding, efficient design of CSI-RS is a crucial factor. For this reason, three types of CSI reporting mechanism corresponding to three types of CSI-RS measurement can be evaluated: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

The present disclosure relates generally to wireless communication systems and, more specifically, to compression-based CSI reporting.

A communication system includes a downlink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL Control Information (DCI), and Reference Signals (RS) that are also known as pilot signals. An eNodeB transmits data information through a Physical DL Shared Channel (PDSCH). An eNodeB transmits DCI through a Physical DL Control Channel (PDCCH) or an Enhanced PDCCH (EPDCCH)—see also document and standard [3]. An eNodeB transmits acknowledgement information in response to data Transport Block (TB) transmission from a UE in a Physical Hybrid Automatic Repeat Request Indicator Channel (PHICH). An eNodeB transmits one or more of multiple types of RS including a UE-Common RS (CRS), a Channel State Information RS (CSI-RS), or a DeModulation RS (DMRS). A CRS is transmitted over a DL system BandWidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe (or slot) and can have, for example, duration of 1 millisecond.

DL signals also include transmission of a logical channel that carries system control information. A broadcast control channel (BCCH) is mapped to either a transport channel referred to as a Broadcast Channel (BCH) when it conveys a Master Information Block (MIB) or to a DL Shared Channel (DL-SCH) when it conveys a System Information Block (SIB)—see also document and standard [3] and document and standard [5]. Most system information is included in different SIBs that are transmitted using DL-SCH. A presence of system information on a DL-SCH in a subframe (or slot) can be indicated by a transmission of a corresponding PDCCH conveying a codeword with a cyclic redundancy check (CRC) scrambled with a special System Information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe (or slot) and a group of Physical resource blocks (PRBs). A transmission BW incudes frequency resource units referred to as Resource Blocks (RBs). Each RB includes $$N_{sc}^{RB}$$

sub-carriers, or Resource Elements (REs), such as 12 REs. A unit of one RB over one subframe (or slot) is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL Control Information (UCI), and UL RS. UL RS includes DMRS and Sounding RS (SRS). A UE transmits DMRS only in a BW of a respective PUSCH or Physical UL Control Channel (PUCCH). An eNodeB can use a DMRS to demodulate data signals or UCI signals. A UE transmits SRS to provide an eNodeB with an UL CSI. A UE transmits data information or UCI through a respective PUSCH or a PUCCH. If a UE requires to transmit data information and UCI in a same UL subframe (or slot), it may multiplex both in a PUSCH. UCI includes Hybrid Automatic Repeat reQuest ACKnowledgement (HARQ-ACK) information, indicating correct (ACK) or incorrect (NACK) detection for a data TB in a PDSCH or absence of a PDCCH detection (DTX), Scheduling Request (SR) indicating whether a UE has data in its buffer, Rank Indicator (RI), and Channel State Information (CSI) enabling an eNodeB to perform link adaptation for PDSCH transmissions to a UE. HARQ-ACK information is also transmitted by a UE in response to a detection of a PDCCH/enhanced PDCCH (EPDCCH) indicating a release of semi-persistently scheduled PDSCH (see also document and standard [3]).

An UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}$=1. A last subframe (or slot) symbol can be used to multiplex SRS transmissions from one or more UEs. A number of subframe (or slot) symbols that are available for data/UCI/DMRS transmission is $$N_{symb} = 2 \cdot \left(N_{symb}^{UL} - 1\right) - N_{SRS},$$

where $N_{SRS}$=1 if a last subframe (or slot) symbol is used to transmit SRS and $N_{SRS}$=0 otherwise.

Figure 6:
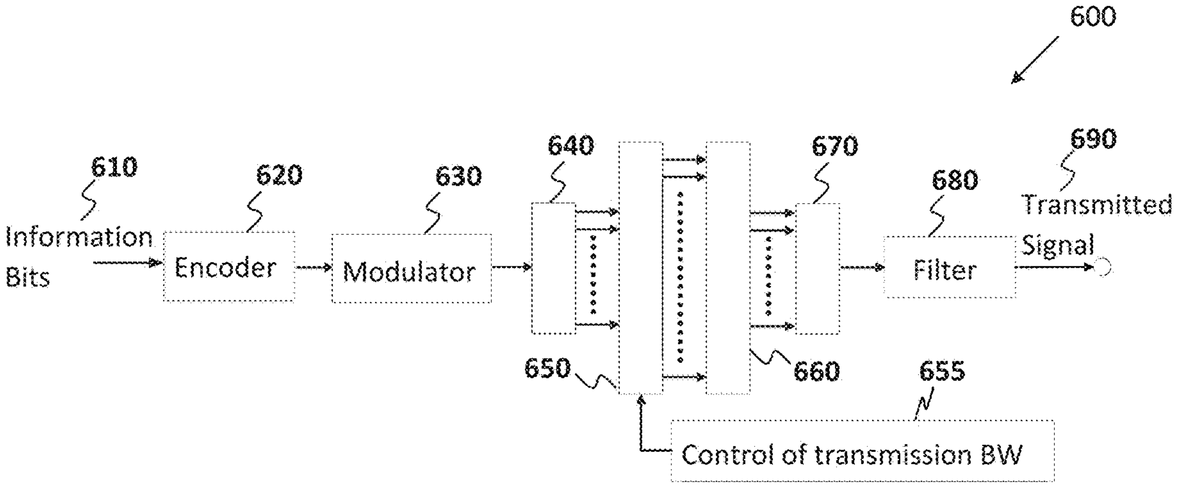
FIG. 6 illustrates an example of a transmitter structure for a physical downlink shared channel (PDSCH) in a subframe according to embodiments of the present disclosure.

FIG. 6 illustrates an example of a transmitter structure 600 for PDSCH in a subframe according to embodiments of the present disclosure. For example, transmitter structure 600 can be implemented in gNB 102 of FIG. 1. This example is for illustration only and other embodiments can be used without departing from the scope of the present disclosure.

As illustrated in FIG. 6, information bits 610 are encoded by encoder 620, such as a turbo encoder, and modulated by modulator 630, for example using Quadrature Phase Shift Keying (QPSK) modulation. A Serial to Parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse Fast Fourier Transform (IFFT), the output is then serialized by a Parallel to Serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
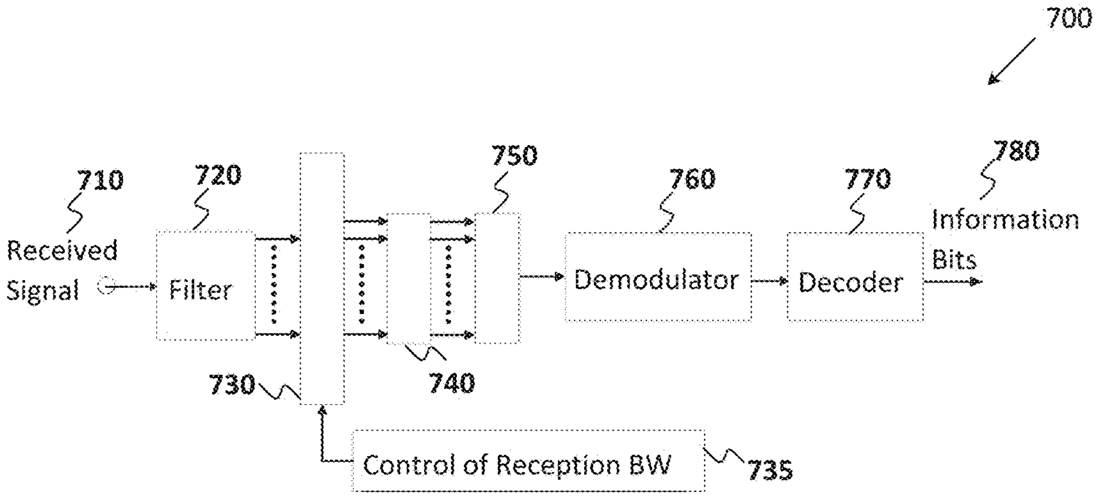
FIG. 7 illustrates an example of a receiver structure for a PDSCH in a subframe according to embodiments of the present disclosure.

FIG. 7 illustrates an example of a receiver structure 700 for PDSCH in a subframe according to embodiments of the present disclosure. For example, receiver structure 700 can be implemented by any of the UEs 111-116 of FIG. 1. This example is for illustration only and other embodiments can be used without departing from the scope of the present disclosure.

With reference to FIG. 7, a received signal 710 is filtered by filter 720, REs 730 for an assigned reception BW are selected by BW selector 735, unit 740 applies a Fast Fourier Transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
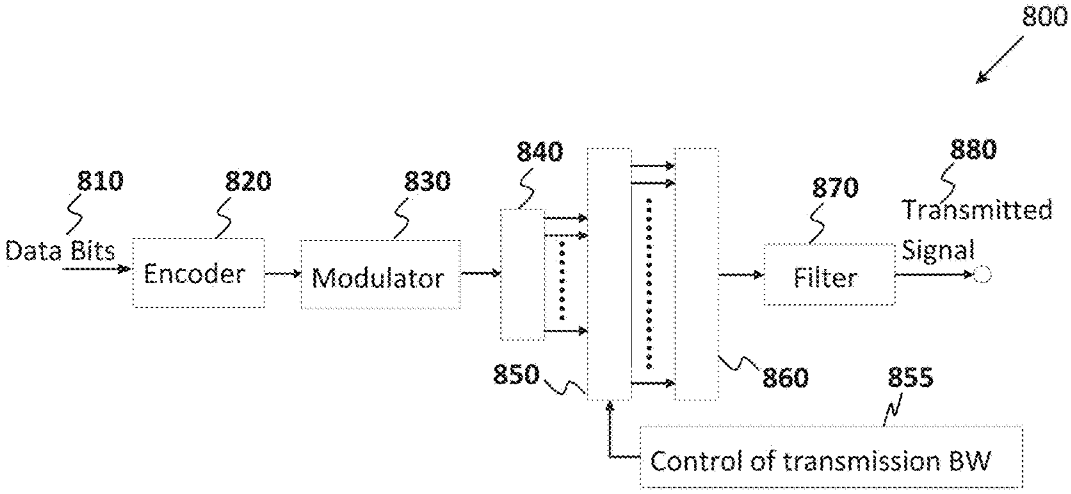
FIG. 8 illustrates an example of a transmitter structure for a physical uplink shared channel (PUSCH) in a subframe according to embodiments of the present disclosure.

FIG. 8 illustrates an example of a transmitter structure 800 for PUSCH in a subframe according to embodiments of the present disclosure. For example, transmitter structure 800 can be implemented in gNB 103 of FIG. 1. This example is for illustration only and other embodiments can be used without departing from the scope of the present disclosure.

As illustrated in FIG. 8, information data bits 810 are encoded by encoder 820, such as a turbo encoder, and modulated by modulator 830. A Discrete Fourier Transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
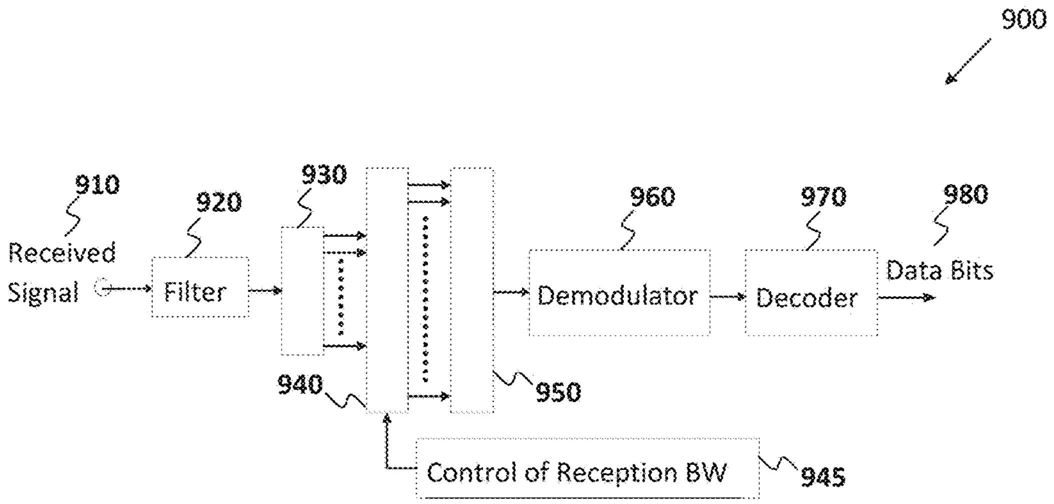
FIG. 9 illustrates an example of a receiver structure for a PUSCH in a subframe according to embodiments of the present disclosure.

FIG. 9 illustrates an example of a receiver structure 900 for a PUSCH in a subframe according to embodiments of the present disclosure; For example, receiver structure 900 can be implemented by the UE 116 of FIG. 3. This example is for illustration only and other embodiments can be used without departing from the scope of the present disclosure.

As illustrated in FIG. 9, a received signal 910 is filtered by filter 920. Subsequently, after a cyclic prefix is removed (not shown), unit 930 applies a FFT, REs 940 corresponding to an assigned PUSCH reception BW are selected by a reception BW selector 945, unit 950 applies an Inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In a wireless communication system, MIMO is often identified as key feature in order to achieve high system throughput requirements. One of the key components of a MIMO transmission scheme is the accurate CSI acquisition at the eNB (or gNB) (or TRP). For multi-user MIMO (MU-MIMO), in particular, the availability of accurate CSI is essential in order to guarantee high MU performance. For time division duplexing (TDD) systems, the CSI can be acquired using the SRS transmission relying on the channel reciprocity. For frequency division duplexing (FDD) systems, on the other hand, it can be acquired using the CSI-RS transmission from eNB (or gNB), and CSI acquisition and feedback from UE. In common FDD systems, the CSI feedback framework is 'implicit' in the form of channel quality indicator (CQI)/precoding matrix indicator (PMI)/rank indicator (RI) (also CSI reference signal identity (CRI) and layer identity (LI)) derived from a codebook implying SU transmission from eNB (or gNB).

In 5G or NR systems ([document and standard [7], document and standard [8]), the herein-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, embodiments of the present disclosure recognize the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in document and standard [8]). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising each component) requires to be reported by the UE (e.g., the UE 116). However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in document and standard [8]), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (UL-DL channel reciprocity in angular domain), and the beamforming information can be obtained at the gNB (e.g., the gNB 102) based on UL channel estimated using SRS measurements.

In Rel. 17 NR, CSI reporting has been enhanced to support the following:

- Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (UL-DL channel reciprocity in angular domain) or/and FD (UL-DL channel reciprocity in delay/frequency domain), and the corresponding SD or/and FD beamforming information can be obtained at the gNB based on UL channel estimated using SRS measurements. In Rel. 17, such a codebook is supported (which is referred to as Rel. 17 further enhanced Type II port selection codebook in document and standard [8]).

Non-coherent joint transmission (NCJT) CSI reporting: When the UE can communicate with multiple TRPs that are distributed at different locations in space (e.g., within a cell), the CSI reporting can correspond to a single TRP hypothesis (i.e., CSI reporting for one of the multiple TRPs) or multi-TRP hypothesis (i.e., CSI reporting for at least two of the multiple TRPs). The CSI reporting for both single TRP and multi-TRP hypotheses are supported in Rel. 17. However, the multi-TRP CSI reporting imply a NCJT, i.e., a layer (and precoder) of the transmission is restricted to be transmitted from only one TRP.

In Rel. 18 MIMO WID includes the following objectives on CSI enhancements:

Study and, if justified, specify enhancements of CSI acquisition for Coherent-JT targeting FR1 and up to 4 TRPs, implying ideal backhaul and synchronization as well as the same number of antenna ports across TRPs, as follows:

Rel-16/17 Type-II codebook refinement for coherent joint transmission (CJT) multi-TRP (mTRP) targeting FDD and its associated CSI reporting, taking into account throughput-overhead trade-off.

Study and, if justified, specify CSI reporting enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis UE reporting of time-domain channel properties measured via CSI-RS for tracking The first objective extends the Rel.17 NCJT CSI to coherent JT (CJT), and the second extends FD compression in the Rel.16/17 codebook to include time (Doppler) domain compression. Both extensions are based on the same common codebook, i.e., Rel. 16/17 codebook. In the present disclosure, a unified codebook design evaluating both extensions have been provided.

Figure 10:
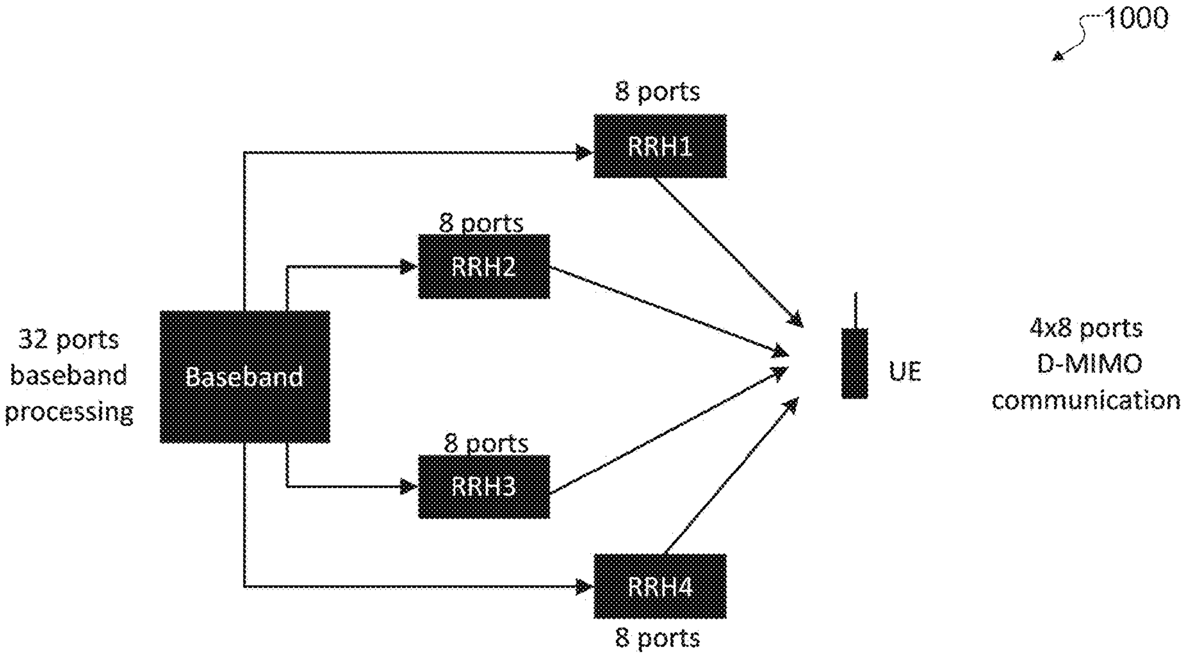
FIG. 10 illustrates an example of a distributed MIMO (DMIMO) according to embodiments of the present disclosure.

FIG. 10 illustrates an example of a DMIMO according to embodiments of the present disclosure. For example, the DMIMO 1000 may be implemented by one or more BSs such as BS 102. The DMIMO 1000 is for illustration only and other embodiments can be used without departing from the scope of the present disclosure.

The main use case or scenario of interest for CJT/DMIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) cannot be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system.

The multiple RRHs in a D-MIMO setup can be utilized for spatial multiplexing gain (based on CSI reporting). Since RRHs are geographically separated, they (RRHs) tend to contribute differently to CSI reporting. This motivates a dynamic RRH selection followed by CSI reporting condition on the RRH selection. The present disclosure provides example embodiments on how channel and interference signal can be measure under different RRH selection hypotheses. Additionally, the signaling details of such a CSI reporting and CSI-RS measurement are also provided.

Figure 11:
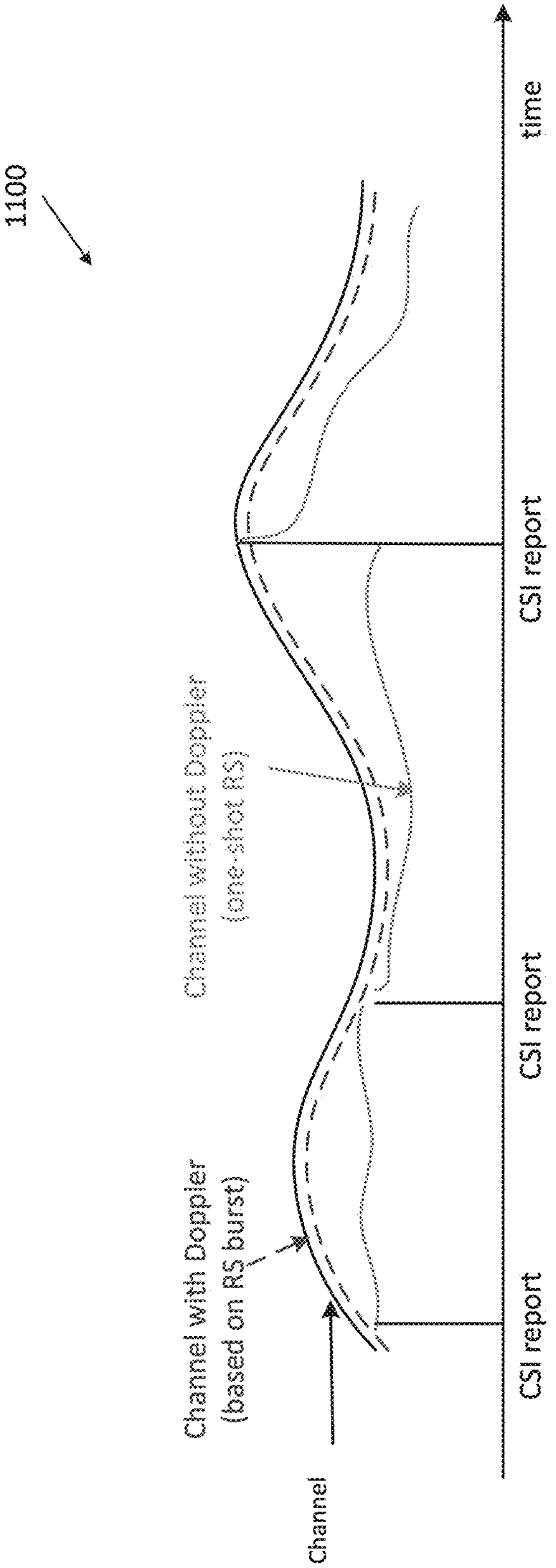
FIG. 11 illustrates an example of a timeline for channel measurement with and without Doppler components according to embodiments of the present disclosure.

FIG. 11 illustrates an example of a timeline 1100 for channel measurement with and without Doppler components according to embodiments of the present disclosure. For example, timeline 1100 for channel measurement with and without Doppler components can be followed by the UE 112 of FIG. 1. This example is for illustration only and can be used without departing from the scope of the present disclosure.

The main use case or scenario of interest for time-/Doppler-domain compression is moderate to high mobility scenarios. When the UE's speed is in a moderate or high speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is called for, which is based on the Doppler components of the channel. As described in document and standard [9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When RS is CSI-RS, the UE measures a CSI-RS burst, and use it to obtain Doppler components of the DL channel. When RS is SRS, the gNB measures an SRS burst, and uses it to obtain Doppler components of the UL channel. The obtained Doppler components can be reported by the UE using a codebook (as part of a CS report). Or the gNB can use the obtained Doppler components of the UL channel to beamform CSI-RS for CSI reporting by the UE. Embodiments of the present disclosure recognizes that when the channel is measured with the Doppler components (e.g., based on an RS burst), the measured channel can remain close to the actual varying channel and, on the other hand, when the channel is measured without the Doppler components (e.g., based on a one-shot RS), the measured channel can be far from the actual varying channel.

The present disclosure relates to CSI acquisition at gNB. In particular, it relates to the CSI reporting based on a high-resolution (or Type II) codebook comprising spatial-, frequency- or/and time-(Doppler-)domain components for a distributed antenna structure (DMIMO). Three aspects of the present disclosure include:

- CSI computation time based on a number of active CSI-RS resources for Doppler Type-II CSI reporting
- CSI computation time based on N4 for Doppler Type-II CSI reporting
- CSI computation time based on a periodicity of CSI-RS resource for Doppler Type-II CSI reporting Aspects, features, and advantages of the present disclosure are readily apparent from the following detailed description, simply by illustrating a number of particular embodiments and implementations, including the best mode contemplated for carrying out the present disclosure. Embodiments of the present disclosure also capable of other and different embodiments, and its several details can be modified in various obvious respects, all without departing from the spirit and scope of the present disclosure. Accordingly, the drawings and description are to be regarded as illustrative in nature, and not as restrictive. Embodiments of the present disclosure are illustrated by way of example, and not by way of limitation, in the figures of the accompanying drawings.

In the following, for brevity, both FDD and TDD are regarded as the duplex method for both DL and UL signaling.

Although exemplary descriptions and embodiments to follow imply orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

Each of the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, each of the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include each of the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE (e.g., the UE 116) can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may be called for multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for each of the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
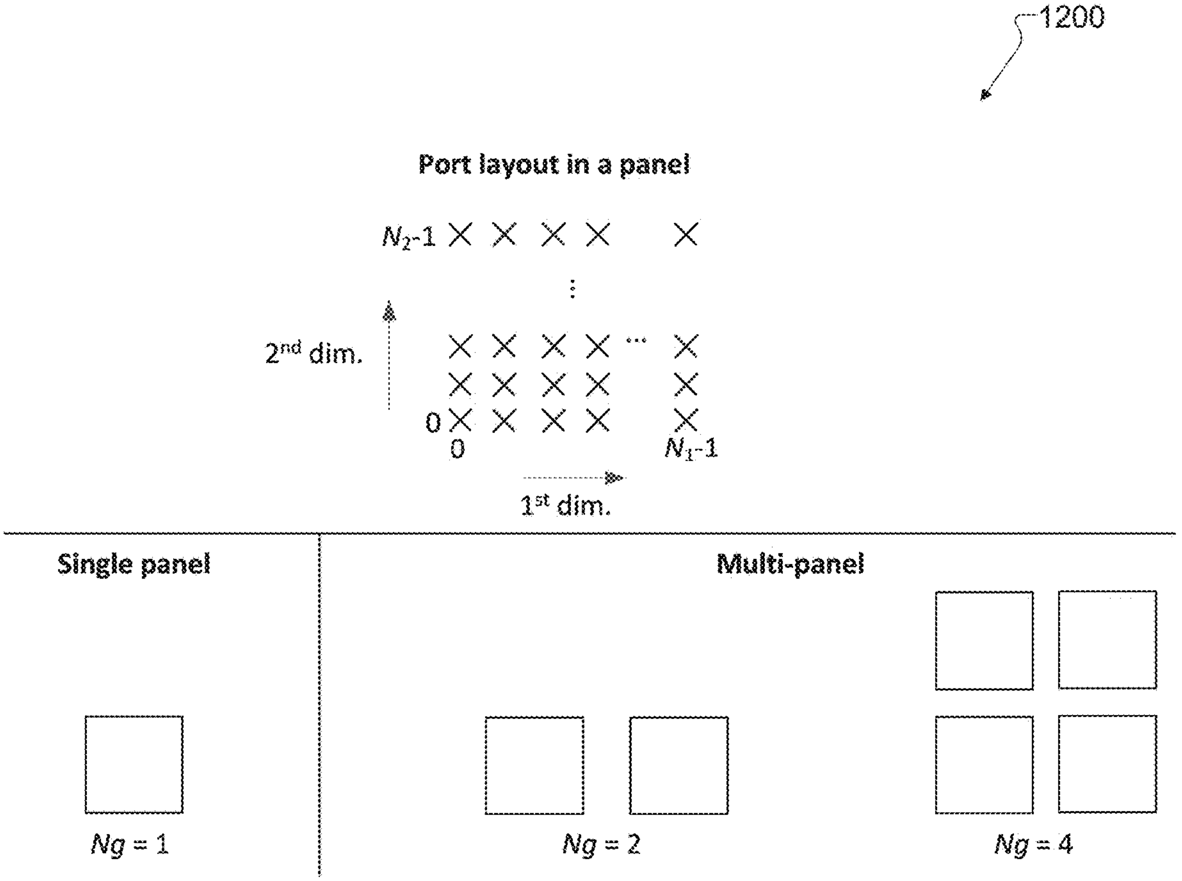
FIG. 12 illustrates a diagram of an antenna port layout according to embodiments of the present disclosure.

FIG. 12 illustrates a diagram of an antenna port layout 1200 according to embodiments of the present disclosure. For example, antenna port layout 1200 of an antenna port layout can be implemented by the BS 102 of FIG. 2. This example is for illustration only and can be used without departing from the scope of the present disclosure.

With reference to FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$ when each antenna maps to an antenna port. "X" represents two antenna polarizations. In the present disclosure, the term "polarization" refers to a group of antenna ports. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g. X=3000, then antenna ports are 3000, 3001, 3002, . . . ). Let $N_g$ be a number of antenna panels at the gNB. When there are multiple antenna panels ($N_g>1$), it is implied that each panel is dual-polarized antenna ports with $N_1$ and $N_2$ ports in two dimensions. Note that the antenna port layouts may or may not be the same in different antenna panels.

In one example, the antenna architecture of a D-MIMO or coherent joint transmission (CJT) system is structured. For example, the antenna structure at each RRH (or TRP) is dual-polarized (single or multi-panel as shown FIG. 12). The antenna structure at each RRH/TRP can be the same. Or the antenna structure at an RRH/TRP can be different from another RRH/TRP. Likewise, the number of ports at each RRH/TRP can be the same. Or the number of ports at one RRH/TRP can be different from another RRH/TRP. In one example, $N_g=N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

Embodiments of the present disclosure imply a structured antenna architecture in the rest of the present disclosure. For simplicity, each RRH/TRP is equivalent to a panel, although an RRH/TRP can have multiple panels in practice. However, the present disclosure is not restrictive to a single panel at each RRH/TRP and can easily be extended (covers) the case when an RRH/TRP has multiple antenna panels.

In one embodiment, an RRH constitutes (or corresponds to or is equivalent to) at least one of the following:

- In one example, an RRH corresponds to a TRP.
- In one example, an RRH or TRP corresponds to a CSI-RS resource. A UE is configured with $K=N_{RRH}>1$ non-zero-power (NZP) CSI-RS resources and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained herein.
- In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in the present disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.
- In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.
- In one example an RRH or TRP corresponds to one or more examples described herein depending on a configuration. For example, this configuration can be explicit via a parameter (e.g., an RRC parameter). Or it can be implicit.
  - In one example, when implicit, it could be based on the value of K. For example, when K>1 CSI-RS resources, an RRH corresponds to example, and when K=1 CSI-RS resource, an RRH corresponds to one or more examples described herein.
  - In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when RRH or TRP maps (or corresponds to) a CSI-RS resource or resource group, and a UE can select a subset of RRHs (resources or resource groups) and report the CSI for the selected RRHs (resources or resource groups). The selected RRHs can be reported via an indicator. For example, the indicator can be a CRI or a PMI (component) or a new indicator.

In one example, when RRH maps (or corresponds to) a CSI-RS port group, and a UE can select a subset of RRHs (port groups) and report the CSI for the selected RRHs (port groups). The selected RRHs can be reported via an indicator. For example, the indicator can be a CRI or a PMI (component) or a new indicator.

In one example, when multiple (K>1) CSI-RS resources are configured for $N_{RRH}$ RRHs, a decoupled (modular) codebook is used/configured, and when a single (K=1) CSI-RS resource for $N_{RRH}$ RRHs, a joint codebook is used/configured.

Figure 13:
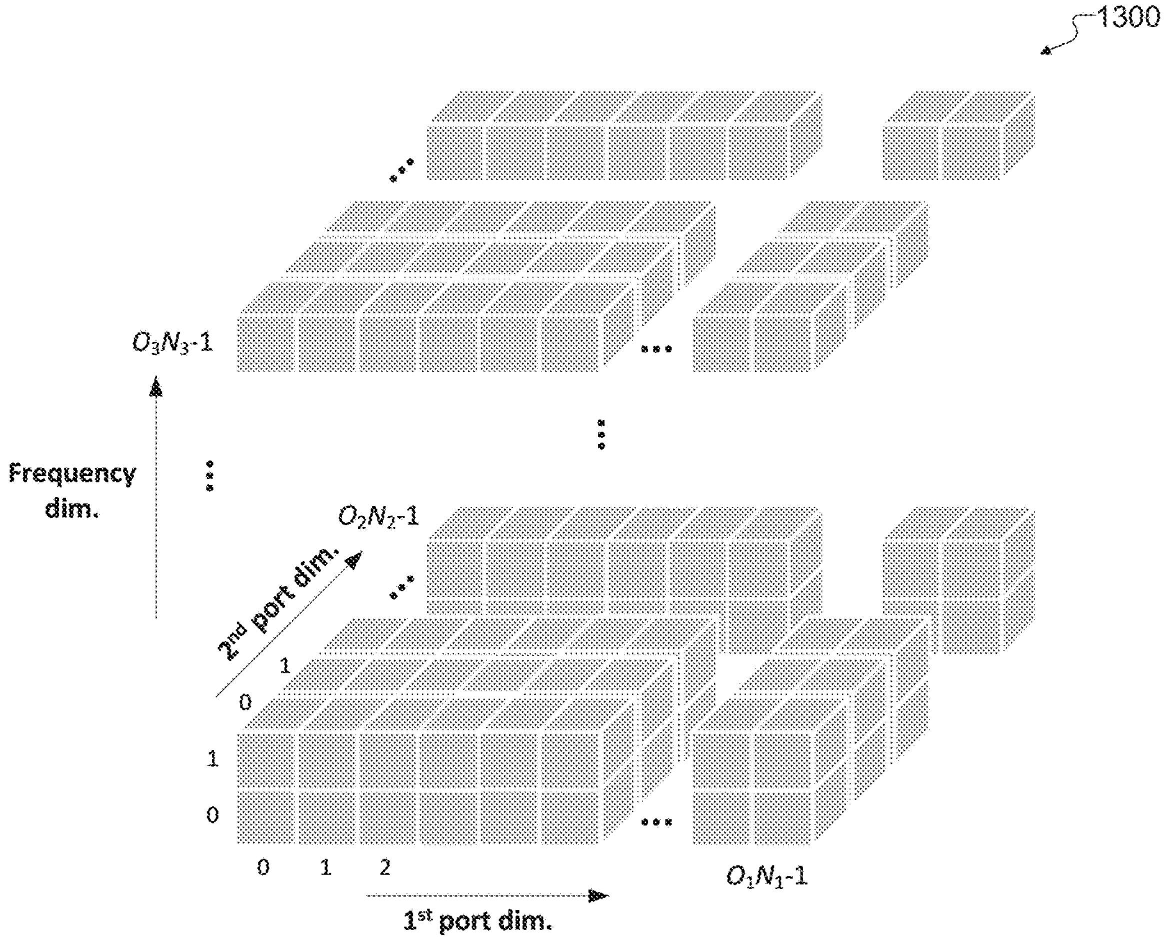
FIG. 13 illustrates a diagram of an example 3D grid of direct Fourier transform (DFT) beams according to embodiments of the present disclosure.

FIG. 13 illustrates a diagram 1300 of an example 3D grid of DFT beams according to embodiments of the present disclosure. For example, diagram 1300 can be implemented by the BS 102 of FIG. 1. This example is for illustration only and can be used without departing from the scope of the present disclosure.

As described in U.S. Pat. No. 10,659,118 issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include frequency dimension in addition to the 1st and 2nd antenna port dimensions. With reference to FIG. 13, the following is shown:

- 1st dimension is associated with the 1st port dimension,
- 2nd dimension is associated with the 2nd port dimension, and
- 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_1$ belongs to {2, 4, 8}. In yet another example, at least one of $O_1$, $O_2$, and $O_3$ is higher layer configured (via RRC signaling).

As explained in document and standard [8], a UE is configured with higher layer parameter codebookType set to 'typeII-PortSelection-r16' for an enhanced Type II CSI reporting in which the pre-coders for each of the SBs and for a given layer l=1, . . . , v, where v is the associated RI value, is given by either $$W^l = AC_lB^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \sum_{f=0}^{M-1}\sum_{i=0}^{L-1} c_{l,i,f}(a_i b_f^H) = \sum_{i=0}^{L-1}\sum_{f=0}^{M-1} c_{l,i,f}(a_i b_f^H), \quad \text{(Eq. 1)}$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \begin{bmatrix} \sum_{f=0}^{M-1}\sum_{i=0}^{L-1} c_{l,i,f}(a_i b_f^H) \\ \sum_{f=0}^{M-1}\sum_{i=0}^{L-1} c_{l,i+L,f}(a_i b_f^H) \end{bmatrix}, \quad \text{(Eq. 2)}$$

where:

$N_1$ is a number of antenna ports in a first antenna port dimension (having the same antenna polarization).

$N_2$ is a number of antenna ports in a second antenna port dimension (having the same antenna polarization).

$P_{CSI-RS}$ is a number of CSI-RS ports configured to the UE.

$N_3$ is a number of SBs for PMI reporting or number of FD units or number of FD components (that comprise the CSI reporting band) or a total number of precoding matrices indicated by the PMI (one for each FD unit/component).

$\alpha_i$ is a $2N_1N_2\times1$ (Eq. 1) or $N_1N_2\times1$ (Eq. 2) column vector, or $\alpha_i$ is a $P_{CSIRS}\times1$ (Eq. 1) or $$\frac{P_{CSIRS}}{2} \times 1$$

port selection column vector, where a port selection vector is a defined as a vector which contains a value of 1 in one element and zeros elsewhere.

$b_f$ is a $N_3\times1$ column vector.

$c_{l,i,f}$ is a complex coefficient.

In a variation, when the UE reports a subset K<2LM coefficients (where K is either fixed, configured by the gNB or reported by the UE 116), then the coefficient $c_{l,i,f}$ in precoder equations Eq. 1 or Eq. 2 is replaced with $x_{l,i,f}\times c_{l,i,f}$, where:

$x_{l,i,f}=1$ if the coefficient $c_{l,i,f}$ is reported by the UE according to some embodiments of the present disclosure.

$x_{l,i,f}=0$ otherwise (i.e., $c_{l,i,f}$ is not reported by the UE).

The indication whether $x_{l,i,f}=1$ or 0 is according to one or more embodiments described in the present disclosure. For example, it can be via a bitmap.

In a variation, the precoder equations Eq. 1 or Eq. 2 are respectively generalized to:

$$W^l = \sum_{i=0}^{L-1}\sum_{f=0}^{M_i-1} c_{l,i,f}(a_i b_{i,f}^H) \quad \text{(Eq. 3)}$$

and $$W^l = \begin{bmatrix} \sum_{i=0}^{L-1}\sum_{f=0}^{M_i-1} c_{l,i,f}(a_i b_{i,f}^H) \\ \sum_{i=0}^{L-1}\sum_{=0}^{M_i-1} c_{l,i+L,f}(a_i b_{i,f}^H) \end{bmatrix}, \quad \text{(Eq. 4)}$$

and where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}}[\,W^1 \;\; W^2 \;\; \ldots \;\; W^R\,].$$

Eq. 2 is implied in the rest of the present disclosure. However, the embodiments of the present disclosure are general and are also application to Eq. 1, Eq. 3, and Eq. 4.

Here $$L \leq \frac{P_{CSI-RS}}{2} \text{ and } M \leq N_3. \text{ If } L = \frac{P_{CSI-RS}}{2},$$

then A is an identity matrix, and hence not reported. Likewise, if M $N_3$, then B is an identity matrix, and hence not reported. $M<N_3$, in an example, to report columns of B, the oversampled DFT codebook is used. For instance, $b_f=w_f$, where the quantity $w_f$ is given by:

$$w_f = \left[\, 1 \quad e^{j\frac{2\pi n_{3,l}^{(f)}}{O_3N_3}} \quad e^{j\frac{2\pi\cdot 2n_{3,l}^{(f)}}{O_3N_3}} \quad \ldots \quad e^{j\frac{2\pi\cdot(N_3-1)n_{3,l}^{(f)}}{O_3N_3}} \,\right]^T.$$

When $O_3=1$, the FD basis vector for layer $l\in\{1, \ldots, v\}$ (where v is the RI or rank value) is given by:

$$w_f = \left[\, y_{0,l}^{(f)} \;\; y_{1,l}^{(f)} \;\; \ldots \;\; y_{N_3-1,l}^{(f)} \,\right]^T,$$

where $$y_{t,l}^{(f)} = e^{j\frac{2\pi t n_{3,l}^{(f)}}{N_3}}$$

and $$n_{3,l} = \left[n_{3,l}^{(0)}, \ldots, n_{3,l}^{(M-1)}\right] \text{ where } n_{3,l}^{(f)} \in \{0, 1, \ldots, N_3-1\}.$$

In another example, discrete cosine transform (DCT) basis is used to construct/report basis B for the $3^{rd}$ dimension. The m-th column of the DCT compression matrix is simply given by:

$$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K=N_3$, and $m=0, \ldots K_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The present disclosure is applicable to any other basis vectors to construct/report A and B.

On a high level, a precoder $W^l$ can be described as follows:

$$W = A_l C_l B_l^H = W_1 \tilde{W}_2 W_f^H, \quad \text{(Eq. 5)}$$

where $A=W_1$ corresponds to the Rel. 15 $W_1$ in Type II CSI codebook (document and standard [8]), and $B=W_f$.

The $C_l=\tilde{W}_2$ matrix includes each of the called for linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $$p_{l,i,f} = p_{l,i,f}^{(1)} p_{l,i,f}^{(2)}$$

where:

$$p_{l,i,f}^{(1)}$$

is a reference or first amplitude which is reported using an A1-bit amplitude codebook where A1 belongs to {2, 3, 4}, and $$p_{l,i,f}^{(2)}$$

is a differential or second amplitude which is reported using a A2-bit amplitude codebook where A2≤A1 belongs to {2, 3, 4}.

The framework mentioned herein (equation 5) represents the precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows:

$$W = A_l C_l B_l^H = W_1 \tilde{W}_2 W_t^H. \quad \text{(Eq. 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of the present disclosure is applicable to both space-frequency (equation 5) and space-time (equation 5A) frameworks.

In the present disclosure, the framework mentioned herein for CSI reporting based on space-frequency compression (equation 5) or space-time compression (equation 5A) frameworks can be extended in two directions:

time or Doppler domain compression (e.g., for moderate to high mobility UEs) and joint transmission across multiple RRHs/TRP (e.g., for a DMIMO or multiple TRP systems).

Figure 14:
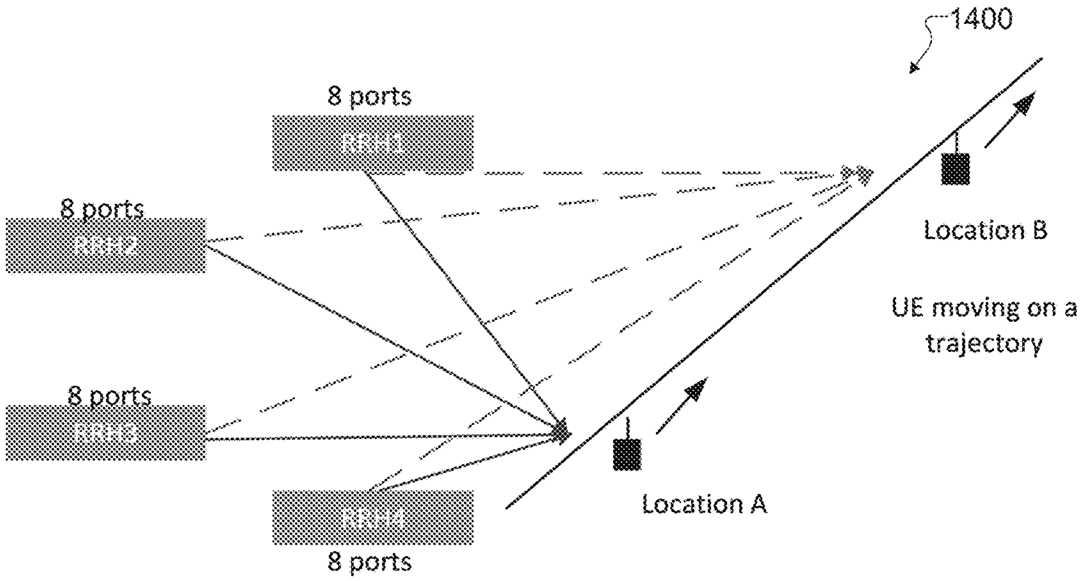
FIG. 14 illustrates an example of a UE moving on a trajectory located in a DMIMO according to embodiments of the present disclosure.

FIG. 14 illustrates an example of a UE moving on a trajectory 1400 located in a distributed MIMO according to embodiments of the present disclosure. For example, trajectory 1400 located in a distributed MIMO can be implemented by the UE 116 of FIG. 3. This example is for illustration only and can be used without departing from the scope of the present disclosure.

While the UE (e.g., the UE 116) moves from a location A to another location B at high speed (e.g., 60 kmph), the UE measures the channel and the interference (e.g., via NZP CSI-RS resources and CSI interference measurement (CSI-IM) resources, respectively), and then uses them to determine/report CSI regarding CJT from multiple RRHs. The reported CSI can be based on a codebook, which includes components regarding both multiple RRHs, and time-/Doppler-domain channel compression.

Figure 15:
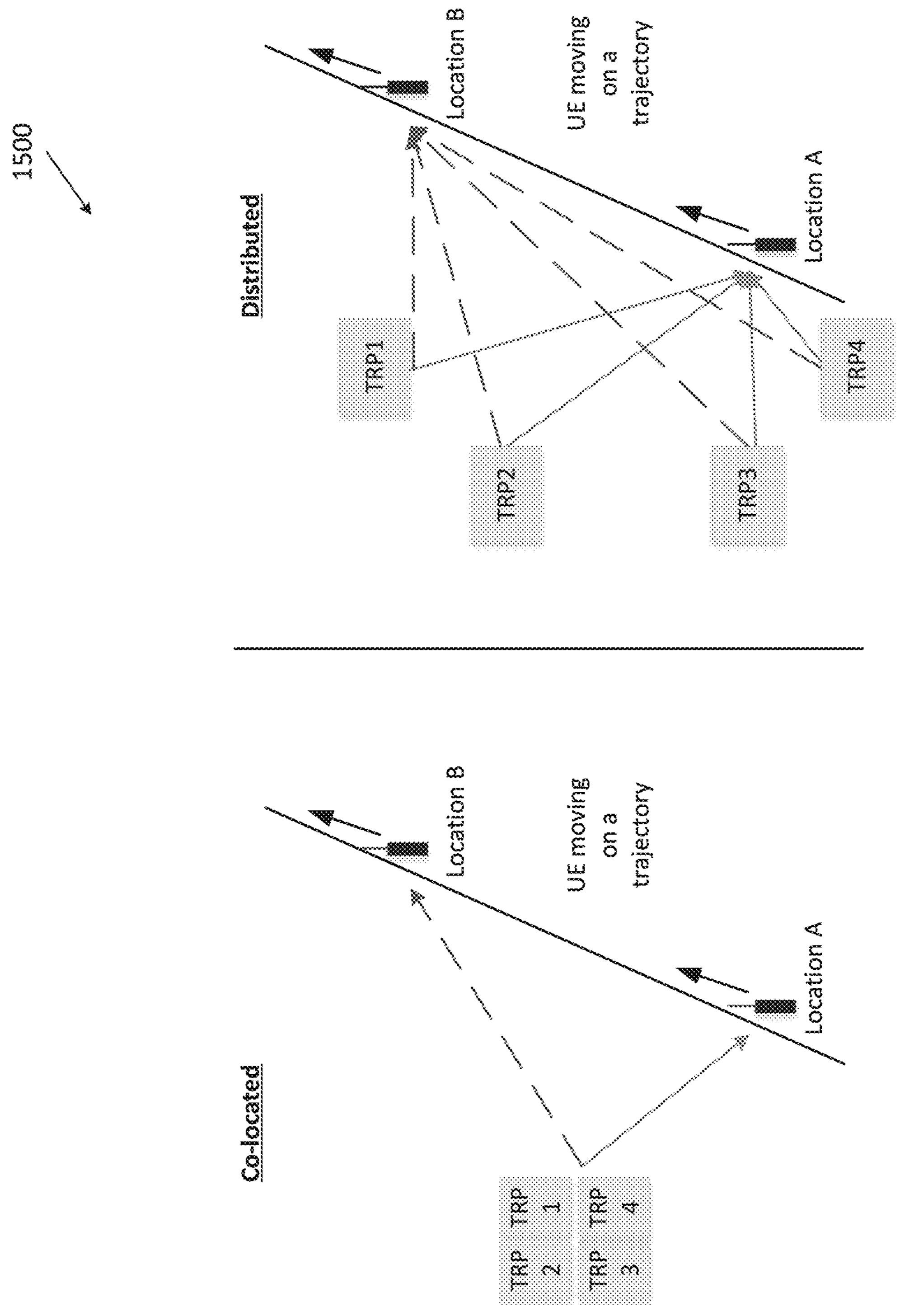
FIG. 15 illustrates examples of a UE moving on a trajectory located in co-located and distributed transmit-receive points (TRP) according to embodiments of the present disclosure.

FIG. 15 illustrates examples of a UE moving on a trajectory 1500 located in co-located and distributed TRPs according to embodiments of the present disclosure. For example, trajectory 1500 located in co-located and distributed TRPs can be implemented by any of the UEs 111-116 of FIG. 1. This example is for illustration only and can be used without departing from the scope of the present disclosure.

In one example scenario, multiple TRPs can be co-located or distributed, and can serve static (non-mobile) or moving UEs. While the UE moves from a location A to another location B, the UE measures the channel, e.g., via NZP CSI-RS resources, (may also measure the interference, e.g., via CSI-IM resources or CSI-RS resources for interference measurement), uses the measurement to determine/report CSI evaluating joint transmission from multiple TRPs. The reported CSI can be based on a codebook. The codebook can include components evaluating multiple TRPs, and frequency/delay-domain channel profile and time/Doppler-domain channel profile.

Figure 16:
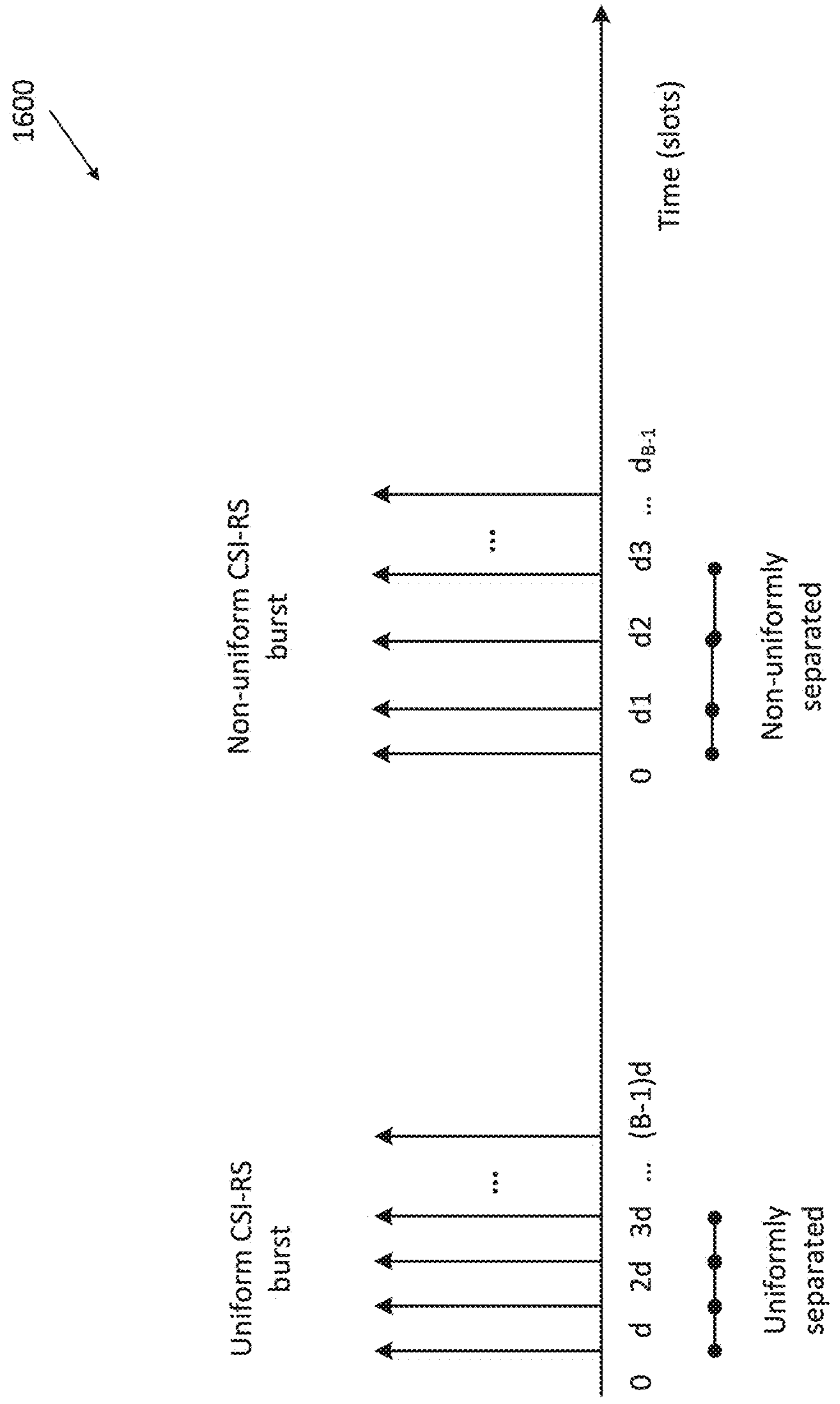
FIG. 16 illustrates an example of a timeline for a UE to receive non-zero-power (NZP) CSI-RS resource(s) bursts according to embodiments of the present disclosure.

FIG. 16 illustrates an example of a timeline 1600 for a UE to receive NZP CSI-RS resource(s) bursts according to embodiments of the present disclosure. For example, timeline 1600 for a UE to receive NZP CSI-RS resource(s) bursts can be followed by the UE 116 of FIG. 3. This example is for illustration only and other embodiments can be used without departing from the scope of the present disclosure.

In one embodiment, a UE is configured to receive a burst of non-zero power (NZP) CSI-RS resource(s), referred to as CSI-RS burst for brevity, within B time slots comprising a measurement window, where $B \geq 1$. The B time slots can be accordingly to at least one of the following examples.

- In one example, the B time slots are evenly/uniformly spaced with an inter-slot spacing d.
- In one example, the B time slots can be non-uniformly spaced with inter-slot spacing $e_1=d_1$, $e_2=d_2-d_1$, $e_3=d_3-d_2$, . . . , so on, where $e_i \neq e_j$ for at least one pair (i, j) with $i \neq j$.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{sc}$, then $h_t = \mathrm{vec}(G_t)$, where $N_{Rx}$, $N_{Tx}$, and $N_{sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, $1 \rightarrow 2 \rightarrow 3 \rightarrow$ and so on, implying that the concatenation starts from the first dimension, then moves second dimension, and continues until the last dimension. Let $H_B = [h_0\ h_1\ \ldots\ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_x \phi_s^H \text{ where } \Phi = [\phi_0\ \phi_1\ \ldots\ \phi_{N-1}]$$

is a Doppler domain (DD) basis matrix whose columns comprise basis vectors, $C=[c_0\ c_1\ \ldots\ c_{N-1}]$ is a coefficient matrix whose columns comprise coefficient vectors, and $N<B$ is the number of DD basis vectors. Since the columns of $H_B$ are likely to be correlated, a DD compression can be achieved when the value of N is small (compared to the value of B). In this example, the Doppler component(s) of the channel is represented by the DD basis matrix $\Phi$ and the coefficient matrix C.

When there are multiple TRPs/RRHs ($N_{RRH}>1$), the UE can be configured to measure the CSI-RS burst(s) according to at least one of the following examples.

In one example, the UE is configured to measure $N_{RRH}$ CSI-RS bursts, one from each TRP/RRH. The $N_{RRH}$ CSI-RS bursts can be overlapping in time (i.e., measured in same time slots). Or they can be staggered in time (i.e., measured in different time slots). Whether overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for each of the $N_{RRH}$ bursts. Or the number B can be the same or different across bursts (or TRPs/RRHs).

- In one example, each CSI-RS burst corresponds to a semi-persistent (SP) CSI-RS resource. The SP CSI-RS resource can be activated or/and deactivated based on a MAC CE or/and DCI based signaling. Additional details are as described in U.S. patent application Ser. No. 17/689,838 filed Mar. 8, 2022 (the '838 application), which is incorporated by reference in its entirety.
- In one example, each CSI-RS burst corresponds to a group of $B \geq 1$ aperiodic (Ap) CSI-RS resources. The Ap-CSI-RS resources can be triggered via a DCI with slot offsets such that they can be measured in B different time slots. The rest of the details can be as described in the '838 application.
- In one example, each CSI-RS burst corresponds to a periodic (P) CSI-RS resource. The P-CSI-RS resource can be configured via higher layer. The first measurement instance (time slot) and the measurement window of the CSI-RS burst (from the P-CSI-RS resource) can be fixed or configured. The rest of the details can be as described in the '838 application.
- In one example, a CSI-RS burst can either be a P-CSI-RS, or SP-CSI-RS or Ap-CSI-RS resource.
  - In one example, the time-domain behavior (P, SP, or Ap) of $N_{RRH}$ CSI-RS bursts is the same.
  - In one example, the time-domain behavior of $N_{RRH}$ CSI-RS bursts can be the same or different.

In one example, the UE is configured to measure $K \geq N_{RRH}$ CSI-RS bursts, where $$K = \sum_{r=1}^{N_{RRH}} K_r$$

and $K_r$ is a number of CSI-RS bursts associated with RRH/TRP r, where $r \in \{1, \ldots, N_{RRH}\}$. Each CSI-RS burst is according to one or more examples described herein. When $K_r>1$, multiple CSI-RS bursts are linked to (or associated with) a CSI reporting setting, i.e., the UE receives the $N_r$ CSI-RS bursts, estimates the DL channels, and obtains the Doppler component(s) of the channel using each of the $N_r$ CSI-RS bursts. The rest of the details can be as described in the '838 application.

In one example, the UE is configured to measure one CSI-RS burst across each of the $N_{RRH}$ TRPs/RRHs. Let P be a number of CSI-RS ports associated with the NZP CSI-RS resource measured via the CSI-RS burst. The CSI-RS burst is according to one or more examples described herein. The total of P ports can be divided into $N_{RRH}$ groups/subsets of ports and one group/subset of ports is associated with (or corresponds to) a TRP/RRH. Then, $$P = \sum_{r=1}^{N_{RRH}} P_r$$

and $P_r$ is a number of CSI-RS ports in the group/subset of ports associated with RRH/TRP r.

- In one example, in each of the B time instances, a UE is configured to measure each groups/subsets of ports, i.e., in each time instance within the burst, the UE measures each of P ports (or $N_{RRH}$ groups/subsets of ports).
- In one example, a UE is configured to measure subsets/groups of ports across multiple time instances, i.e., in each time instance within the burst, the UE measures a subset of P ports or a subset of groups of ports (RRHs/TRPs).

In one example, in each time instance, the UE measures only one group/subset of ports (1 TRP per time instance). In this case, $B=N_{RRH}\times C$ or $B\geq N_{RRH}\times C$, where C is a number of measurement instances for each TRP/RRH.

In one example, the UE is configured to measure one half of the port groups in a time instance, and the remaining half in another time instance.

In one example, the two time instances can be consecutive, for example, the UE measures one half of port groups in even-numbered time instances, and the remaining half in the odd-numbered time instances.

In one example, a first half of the time instances $$\left(\text{e.g., } 0, 1, \ldots, \frac{B}{2}-1\right)$$

is configured to measure one half of the port groups, and the second half of the time instances $$\left(\text{e.g., } \frac{B}{2}, \ldots B-1\right)$$

is configured to measure the remaining half of the port groups.

In one example, the UE is configured to measure multiple CSI-RS bursts, where each burst is according to one or more examples described herein. Multiple CSI-RS bursts are linked to (or associated with) a CSI reporting setting, i.e., the UE receives multiple CSI-RS bursts, estimates the DL channels, and obtains the Doppler component(s) of the channel using each of multiple CSI-RS bursts.

Let $N_4$ be the length of the DD basis vectors $\{\phi_s\}$, e.g., each basis vector is a length $N_4\times 1$ column vector.

Figure 17:
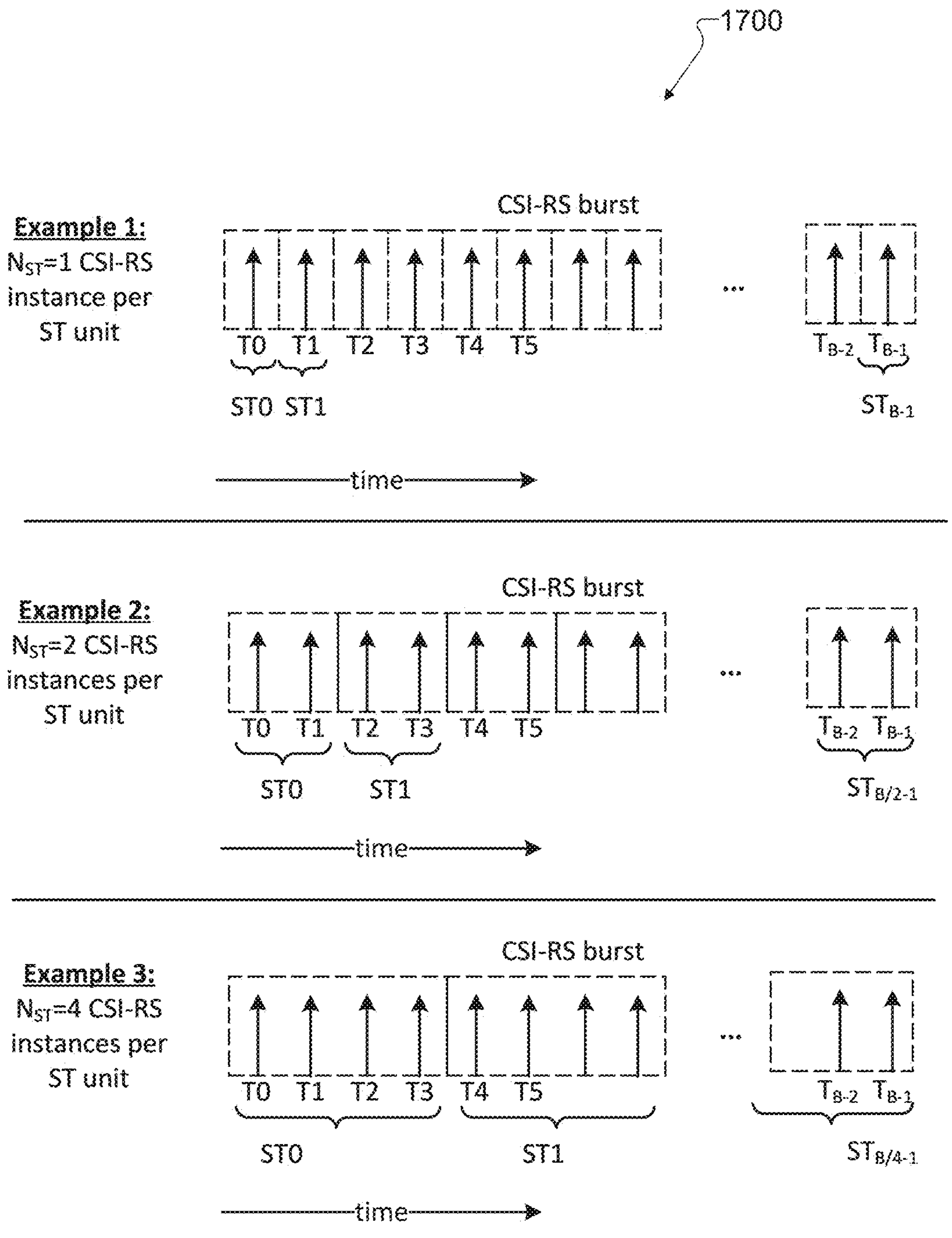
FIG. 17 illustrates examples of timelines for partitioned CSI-RS burst instances according to embodiments of the present disclosure.

FIG. 17 illustrates examples of timelines 1700 for partitioned CSI-RS burst instances according to embodiments of the present disclosure. For example, timelines 1700 for partitioned CSI-RS burst instances. For example, timelines 1700 for partitioned CSI-RS burst instances can be followed by the UE 113 of FIG. 1. This example is for illustration only and other embodiments can be used without departing from the scope of the present disclosure.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4=B$) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. With reference to FIG. 17, three examples of the ST units are shown. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}=1$ or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

When there are multiple TRPs/RRHs ($N_{RRH}>1$), the UE can be configured to determine a value of $N_4$ according to at least one of the following examples.

In one example, a value of $N_4$ is the same for each TRPs/RRHs.

In one example, a value of $N_4$ can be the same or different across TRPs/RRHs.

Figure 18:
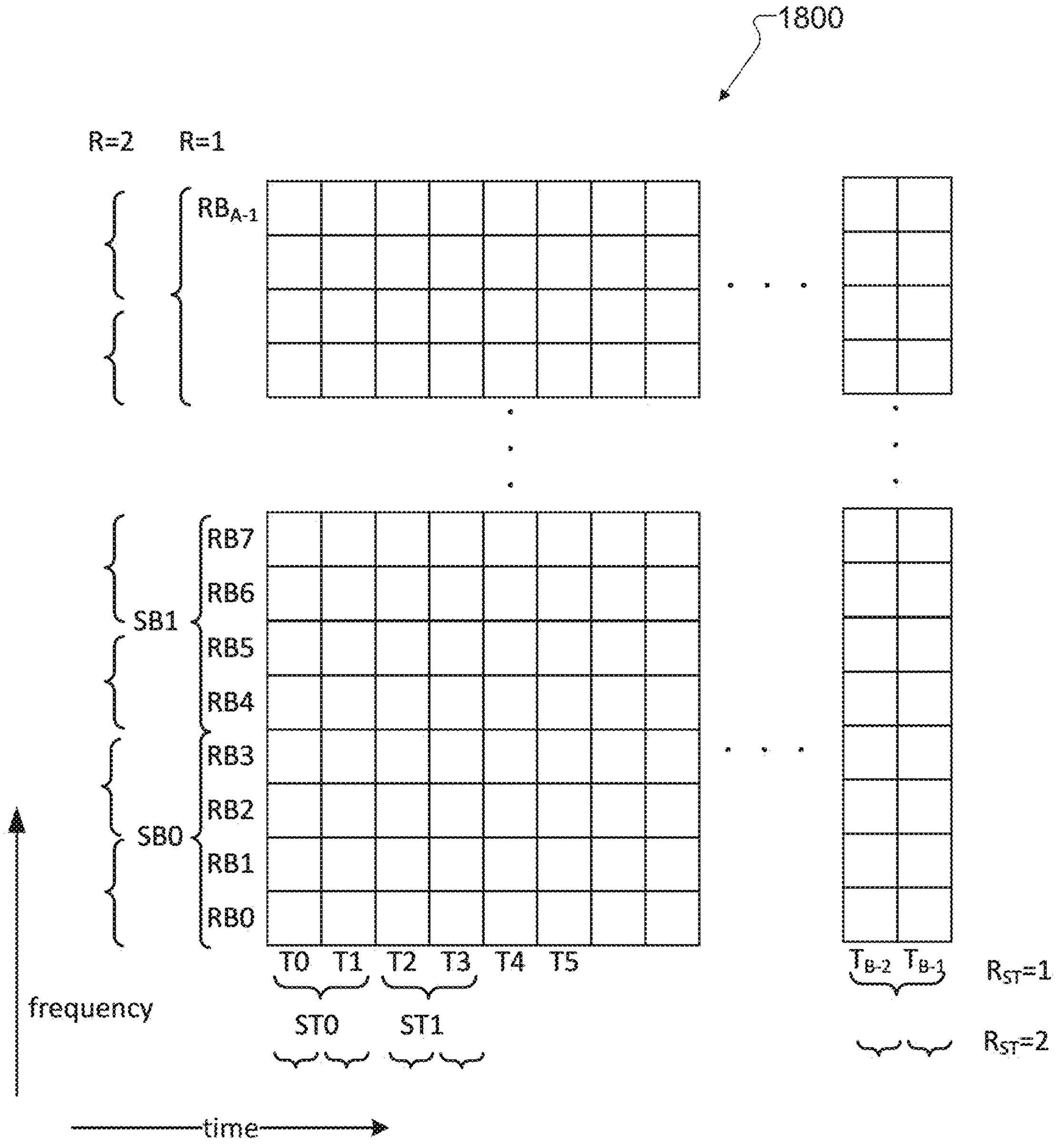
FIG. 18 illustrates an example of a timeline for resource block (RB) and subband (SB) partitions according to embodiments of the present disclosure.

FIG. 18 is an example of a timeline 1800 for RB and SB partitions according to embodiments of the present disclosure. For example, timeline 1800 for RB and SB partitions can be followed by the UE 116 of FIG. 3. This example is for illustration only and other embodiments can be used without departing from the scope of the present disclosure.

In one embodiment, a UE is configured with $J\geq 1$ CSI-RS bursts (as illustrated herein) that occupy a frequency band and a time span (duration), wherein the frequency band comprises A RBs, and the time span comprises B time instances (of CSI-RS resource(s)). When $J>1$, the A RBs or/and B time instances can be aggregated across J CSI-RS bursts. In one example, the frequency band equals the CSI reporting band, and the time span equals the number of CSI-RS resource instances (across J CSI-RS bursts). Both can be configured to the UE for a CSI reporting, which can be based on the DD compression.

The UE is further configured to partition (divide) the A RBs into subbands (SBs) or/and the B time instances into sub-times (STs). The partition of A RBs can be based on a SB size value $N_{SB}$, which can be configured to the UE (cf. Table 5.2.1.4-2 of REF8). The partition of B time instances can be based either a ST size value $N_{ST}$ or an r value, as described in this disclosure. With reference to FIG. 18, RB0, RB1, . . . , $RB_{A-1}$ comprise A RBs, $T_0$, $T_1$, . . . , $T_{B-1}$ comprise B time instances, the SB size $N_{SB}=4$, and the ST size $N_{ST}=2$.

When there are multiple TRPs/RRHs ($N_{RRH}>1$), the UE can be configured to determine subbands (SBs) or/and sub-times (STs) according to at least one of the following examples.

In one example, both subbands (SBs) or/and sub-times (STs) are the same for each TRPs/RRHs.

In one example, subbands (SBs) are the same for each TRPs/RRHs, but sub-times (STs) can be the same or different across RRHs/TRPs.

In one example, sub-times (STs) are the same for each TRPs/RRHs, but subbands (SBs) can be the same or different across RRHs/TRPs.

In one example, both sub-times (STs) and subbands (SBs) can be the same or different across RRHs/TRPs.

For illustration, one or more examples described herein are implied in the rest of this disclosure.

The CSI reporting is based on channel measurements (based on CSI-RS bursts) in three-dimensions (3D): the first dimension corresponds to SD comprising $P_{CSIRS}$ CSI-RS antenna ports (in total across each of the $N_{RRH}$ RRHs/TRPs), the second dimension corresponds to FD comprising $N_3$ FD units (e.g. SB), and the third dimension corresponds to DD comprising $N_4$ DD units (e.g. ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In one embodiment, the DD compression (or DD component or $W_d$ basis) can be turned OFF/ON from the codebook. When turned OFF, $W_d$ can be fixed (hence not reported), e.g., $W_d=1$ (scalar 1) or $W_d=[1, \ldots, 1]$(all-one vector) or $$W_d = \frac{1}{n}[1, \ldots , 1]$$

(all-one vector) or $$W_d = I = \begin{bmatrix} 1 & 0 & 0 \\ 0 & \ddots & 0 \\ 0 & 0 & 1 \end{bmatrix}$$

(identity matrix), where n is a scaling factor (e.g. $n=N_4$) or $$W_d = h_{d^*} = [\phi_0^{(d^*)}\ \phi_1^{(d^*)} \ldots \phi_{N_4-1}^{(d^*)}],$$

where d* is an index of a fixed DD basis vector $h_{d^*}$. In one example, d*=0. In one example, when the DD basis vectors comprise an orthogonal DFT basis set, $h_{d^*}$ is a DD basis vector which corresponds to the DC component. When turned ON, $W_d$ (DD basis vectors) is reported.

- In one example, $W_d$ is turned OFF/ON via an explicit signaling, e.g., an explicit RRC parameter.
- In one example, $W_d$ is turned OFF/ON via a codebook parameter. For example, similar to M=1 in Rel.17, when N=1 is configured, $W_d$ is turned OFF, and when a value N>1 is configured, $W_d$ is turned ON. Here, N denotes a number of DD basis vectors comprising columns of $W_d$.
- In one example, the UE reports whether the DD component is turned OFF (not reported) or ON (reported). This reporting can be via a dedicated parameter (e.g., new UCI/CSI parameter). Or this reporting can be via an existing parameter (e.g., PMI component). A two-part UCI (cf. Rel. 15 NR) can be reused wherein the information whether $W_d$ is turned OFF/ON is included in UCI part 1.
- In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

In one embodiment, a UE is configured with a CSI reporting based on a codebook (UE configured with higher layer parameter codebookType set to 'typeII-Doppler-r18'), where the codebook comprises three bases (SD, FD, and DD/TD), and has a structure such that precoder for layer l is given by:

$$W_l = W_1 \tilde{W}_2 (W_{f,d})^H$$

where:

- $W_1$ includes SD basis vectors.
- $W_{f,d}$ includes FD basis vectors and TD/DD basis vectors.
- $\tilde{W}_2$ is a coefficient matrix.

Let the length of each TD/DD basis vector be $N_4$, and the number of TD/DD basis vectors be Q. In one example, $N_4$ is configured, e.g., via higher-layer (RRC) signalling. In one example, Q is configured via RRC, or reported by the UE (e.g., as part of CSI report). In one example, the common (Rel. 16 enhanced Type II or Rel. 17 further enhanced Type II codebook) is used for reporting $W_1$, $W_f$ (for each layer), and $\tilde{W}_2$ (for each layer).

In one example, at least one of the following examples is used/configured regarding $W_{f,d}$.

In one example, $W_{f,d}=W_f \otimes I$, hence $W_l=W_1\tilde{W}_2(W_f \otimes I)^H$, where the notation $\otimes$ is used for the Kronecker product. Note that when I is z×z identity matrix, then $W_f \otimes I$ implies that $W_f$ is repeated z times. Therefore, $=W_1\tilde{W}_2(W_f \otimes I)^H$ corresponds to one $W_1$, one $W_f$, and z number of $W_2$ reports. In one example, z corresponds to number of TD/DD units. In one example, z corresponds to value of $N_4$ (i.e., $z=N_4$). In one example, the common (Rel. 16 enhanced Type II or Rel. 17 further enhanced Type II codebook) is used for reporting one $W_1$, one $W_f$ (for each layer), and multiple $\tilde{W}_2$ (for each layer).

In one example, $W_{f,d}=W_f \otimes W_d$, hence $W_l=W_1\tilde{W}_2 (W_f \otimes W_d)^H$. In one example, $W_d$ comprises orthogonal DFT vectors as columns. The columns of the $W_d$ correspond to the DD basis vectors.

In one example, $W_{f,d}$ is according to one or more examples described herein based on a condition on the value of $N_4$. For example:

- For $N_4 \le x$, $W_{f,d}$ is according to one or more examples described herein.
- For $N_4 > x$, $W_{f,d}$ is according to one or more examples described herein. In one example, $W_d$ is an orthogonal DFT basis matrix commonly selected for each SD/FD bases reusing the common $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4=4$ or 1 is fixed. In one example, $O_4$ is identical (the same) for different SD components. In one example, $O_4$ is different for different SD components.

In one example, x is fixed, e.g., x=1 or x=2.

In one example, x is configured, e.g., via higher layer (RRC) or MAC CE or DCI (e.g., CSI request field triggering an Aperiodic CSI report).

In one example, x is reported by the UE, e.g., the UE (e.g., the UE 116) reports the value of x via UE capability reporting, or via CSI report.

When x=1, the condition is equivalent to the following:

- For $N_4=1$, $W_{f,d}$ is according to one or more examples described herein. In this case, since I=1, $W_l=W_1\tilde{W}_2 (W_f)^H$, i.e., there is no DD/TD basis, or it is replaced with a scalar value 1. In this case, the PMI reporting can be according to a common codebook (Rel. 16 enhanced Type II or Rel. 17 further enhanced Type II codebook).
- For $N_4>1$, $W_{f,d}$ is according to one or more examples described herein. In one example, $W_d$ is an orthogonal DFT basis matrix commonly selected for each SD/FD bases reusing the common $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4=4$ or 1 is fixed. In one example, $O_4$ is identical (the same) for different SD components. In one example, $O_4$ is different for different SD components. In one example, only Q (denoting the number of selected DD basis vectors or columns of $W_d$)>1 is allowed, i.e., the UE is expected to be configured with Q>1 (e.g., Q=2 or 3 or . . . ), or the UE is not expected to be configured with Q=1.

In one example, the set of supported values for $N_4$ includes {1,2,4,8}.

In one example, the set of supported values for Q includes {1,2} or {1,2,3} or {1,2,3,4}. In one example, when $N_4$=1, Q=1 or vice versa. In one example, Q=2 only when $N_4\geq 2$ or $N_4\geq 3$. In one example, Q=1,2 when $N_4$=2.

In one example, the value of number of P/SP NZP CSI-RS resources configured for CSI reporting including Doppler components is K=1. In one example, the value of number of Ap NZP CSI-RS resources configured for CSI reporting including Doppler components is K∈{4,8,12}. The spacing between two consecutive AP CSI-RS resources can be m∈{1,2}. The value of DD/TD unit d can be {1, m, p}, where p is the periodicity of the P/SP NZP CSI-RS resource. The CSI reporting window (number of slots), [l, . . . , l+$W_{CSI}$−1], where $W_{CSI}=N_4d$, and l=$n_{ref}$ or n+δ, where $n_{ref}$ is slot of the CSI reference resource associated with the CSI report, n is the UL slot in which the CSI reported, and δ∈{0,1,2} is parameter. The values of Q, $N_4$, K, m, d, δ are higher layer configured.

In one embodiment, a UE is configured with a CSI report for Z≥1 TRPs (across or associated with Z NZP CSI-RS resources) based on a codebook that includes components, SD and FD bases (for compression), similar to Rel.16 enhanced Type II codebook (5.2.2.2.5, 38.214) or rel. 17 further enhanced Type II port selection codebook (5.2.2.2.7, 38.214). The value of Z can be equal to $N_{TRP}$, the number of TRPs or NZP CSI-RS resources configured for the CSI report, or the value of Z≤$N_{TRP}$, where Z can be reported by the UE (e.g., via the CSI report) or signaled to the UE (e.g., via MACE CE or/and DCI). In one example, $N_{TRP}$∈{1,2, 3,4}. At least one of the following embodiments is used/configured.

In one embodiment, the UE is configured to report a CSI for N>1 TRPs/RRHs (where TRP corresponds to a NZP CSI-RS resource or a subset of CSI-RS antenna ports within a NZP CSI-RS resource), the CSI determined based on a codebook comprising components: (A) two separate basis matrices $W_1$, $W_f$ for SD and FD compression, respectively, and (B) coefficients $\tilde{W}_2$. In one example, the codebook can be configured via one higher layer parameter codebookType set to 'typeII-cjt-mode2-r18', or via two higher layer parameters codebookType set to 'typeII-cjt-r18' and codebookMode set to 'Mode2'.

In particular, the precoder for layer l is given by $$W_l = A_l C_l B_l^H = \frac{1}{\gamma} W_1 \tilde{W}_2 W_f^H$$

Here, $W_l$ is a $P_{CSIRS}\times N_3$ matrix whose columns are precoding vectors for $N_3$ FD units, $W_1$ is a block diagonal matrix $$\begin{bmatrix} W_{1,1} & 0 & 0 & 0 \\ 0 & \ddots & 0 & 0 \\ 0 & 0 & & \\ 0 & 0 & & W_{1,2N} \end{bmatrix}$$

comprising 2N blocks, where (2(r−1)+1,2r)-th blocks are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or $\tilde{W}_2$ is a $2L\times M_v$ coefficients matrix, where $$L = \sum\nolimits_{r=1}^{N} L_r,$$

and $W_f$ is a $N_3\times M_v$ basis matrix for FD basis matrix (similar to Rel. 16 enhanced Type II codebook). The columns of $W_f$ comprises vectors $$g_{f,l} = \left[y_{0,l}^{(f)}\ y_{1,l}^{(f)}\ \dots\ y_{N_3-1,l}^{(f)}\right],$$

and

γ is a normalization factor.

In one example, for each r=1, . . . , N, $$\begin{bmatrix} W_{1,2(r-1)+1} & 0 \\ 0 & W_{1,2r} \end{bmatrix} = \begin{bmatrix} B_r & 0 \\ 0 & B_r \end{bmatrix}$$

is a $P_{CSIRS,r}$λ$2L_r$ SD basis matrix, where the $L_r$ SD basis vectors comprising columns of $B_r$ are determined the same way as in Rel. 15/16 Type II codebooks (cf. 5.2.2.2.3, REF 8).

In one example, the $M_v$ FD basis vectors, $$g_{f,l} = \left[\ y_{0,l}^{(f)}\ \ y_{1,l}^{(f)}\ \dots\ y_{N_3-1,l}^{(f)}\ \right]^T,$$

f=0, 1, . . . , $M_v$−1, are identified by $n_{3,l}$(l=1, . . . , v) where $$n_{3,l} = \left[n_{3,l}^{(0)}, \dots, n_{3,l}^{(M_v-1)}\right]$$

$$n_{3,l}^{(f)} \in \{0, 1, \dots, N_3-1\}$$

The vector $$y_{t,l} = \left[\ y_{t,l}^{(0)}\ \ y_{t,l}^{(1)}\ \dots\ y_{t,l}^{(M_v-1)}\ \right]$$

comprises entries of FD basis vectors with FD index t={0,1, . . . , $N_{3-1}$}, which is an (FD) index associated with the precoding matrix.

In one example, the FD basis vectors are orthogonal DFT vectors, and $$y_{t,l}^{(f)} = e^{j\frac{2\pi t n_{3,l}^{(f)}}{N_3}}.$$

In one example, the FD basis vectors are oversampled (or rotated) orthogonal DFT vectors with the oversampling (rotation) factor $O_3$, $$y_{t,l}^{(f)} = e^{j\frac{2\pi t n_{3,l}^{(f)}}{O_3 N_3}},$$

and the $M_v$ FD basis vectors are also identified by the rotation index $q_{3,l} \in \{0,1, \ldots, O_3-1\}$. In one example, $O_3$ is fixed (e.g., 1 or 4), or configured (e.g., via RRC), or reported by the UE. In one example, the rotation factor is layer-common (one value for each of the layers), i.e., $q_{3,l}=q_3$.

In one example, each coefficient $x_{l,r,i,f}$ corresponding to row i, column f of the $W_{2,l,r}$ for layer l and TRP (or CSI-RS resource) r can be expressed as $$x_{l,r,i,f} = p_{l,r,\lfloor \frac{i}{L} \rfloor}^{(1)} p_{l,r,i,f}^{(2)} \varphi_{l,r,i,f}$$

similar to Rel. 16 enhanced Type II codebook (cf. Section 5.2.2.2.5, REF 8).

In one embodiment, the UE is configured to report a CSI for N>1 TRPs/RRHs (where TRP corresponds to a NZP CSI-RS resource or a subset of CSI-RS antenna ports within a NZP CSI-RS resource), the CSI determined based on a codebook comprising components: (A) two separate basis matrices $W_1$, $W_f$ for SD and FD compression, respectively, and (B) coefficients $\tilde{W}_2$. In one example, the codebook can be configured via one higher layer parameter codebookType set to 'typeII-cjt-mode1-r18', or via two higher layer parameters codebookType set to 'typeII-cjt-r18' and codebookMode set to 'Mode1'.

In particular, the precoder for layer l is given by $$W_l = A_l C_l B_l^H = \frac{1}{\gamma} W_1 \tilde{W}_2 W_f^H = \frac{1}{\gamma} \begin{bmatrix} W_{1,1} \tilde{W}_{2,1} W_{f,1}^H \\ \vdots \\ W_{1,N} \tilde{W}_{2,N} W_{f,N}^H \end{bmatrix}$$

Here,

- $W_l$ is a $P_{CSIRS} \times N_3$ matrix whose columns are precoding vectors for $N_3$ FD units,
- $W_{1,r}$ is a block diagonal matrix $$\begin{bmatrix} B_r & 0 \\ 0 & B_r \end{bmatrix}$$

comprising 2 blocks that are associated with two antenna polarizations (two halves or groups of CSI-RS antenna ports) of TRP r and each of two blocks is a $$\frac{P_{CSIRS,r}}{2} \times L_r$$

SD basis or port selection matrix (similar to Rel. 16 enhanced Type II codebook or Rel. 17 enhanced Type II codebook), or

- $\tilde{W}_{2,r}$ is a $2L_r \times M_{v,r}$ coefficients matrix, and
- $W_{f,r}$ is a $N_3 \times M_{v,r}$ basis matrix for FD basis matrix (similar to Rel. 16 enhanced Type II codebook). The columns of $W_{f,r}$ comprises vectors $$g_{r,f,l} = \left[ y_{0,l}^{(r,f)} \; y_{1,l}^{(r,f)} \; \ldots \; y_{N_3-1,l}^{(r,f)} \right] \text{ or } g_{f_r,l} = \left[ y_{0,l}^{(f_r)} \; y_{1,l}^{(f_r)} \; \ldots \; y_{N_3-1,l}^{(f_r)} \right],$$

and

- $\gamma$ is a normalization factor.

In one example, for each r=1, . . . , N, $$W_{1,r} = \begin{bmatrix} B_r & 0 \\ 0 & B_r \end{bmatrix}$$

is a $P_{CSIRS,r} \times 2L_r$ SD basis matrix, where the $L_r$ SD basis vectors comprising columns of $B_r$ are determined the same way as in Rel. 15/16 Type II codebooks (cf. 5.2.2.2.3, REF 8).

In one example, the $M_{v,r}$ FD basis vectors, $$g_{r,f,l} = \left[ y_{0,l}^{(r,f)} \; y_{1,l}^{(r,f)} \; \ldots \; y_{N_3-1,l}^{(r,f)} \right]^T,$$

f=0,1, . . . , $M_{v,r}-1$, are identified by $n_{3,l,r}$(l=1, . . . , v) where $$n_{3,l,r} = \left[ n_{3,l,r}^{(0)}, \ldots, n_{3,l,r}^{(M_{v,r}-1)} \right]$$

$$n_{3,l,r}^{(f)} \in \{0, 1, \ldots, N_3 - 1\}$$

The vector $$y_{t,l,r} = \left[ y_{t,l,r}^{(0)} \; y_{t,l,r}^{(1)} \; \ldots \; y_{t,l,r}^{(M_{v,r}-1)} \right]$$

comprises entries of FD basis vectors with FD index t={0,1, . . . , $N_3$-1}, which is an (FD) index associated with the precoding matrix.

In one example, the FD basis vectors are orthogonal DFT vectors, and $$y_{t,l,r}^{(f)} = e^{j\frac{2\pi t n_{3,l,r}^{(f)}}{N_3}}.$$

In one example, the FD basis vectors are oversampled (or rotated) orthogonal DFT vectors with the oversampling (rotation) factor $O_3$, $$y_{t,l,r}^{(f)} = e^{j\frac{2\pi t n_{3,l,r}^{(f)}}{O_3 N_3}},$$

and the $M_{v,r}$ FD basis vectors are also identified by the rotation index $q_{3,l,r} \in \{0,1, \ldots, O_3-1\}$. In one example, $O_3$ is fixed (e.g., 1 or 4), or configured (e.g., via RRC), or reported by the UE. In one example, the rotation factor is layer-common (one value for each of the layers), i.e., $q_{3,l,r}=q_{3,r}$.

In one example, corresponding to row i, column f of the $W_{2,l,r}$ for layer l and TRP (or CSI-RS resource)

$$rx_{l,r,i,f} = p^{(1)}_{l,r,\lfloor \frac{i}{L} \rfloor} p^{(2)}_{l,r,i,f} \varphi_{l,r,i,f}$$

similar to Rel. 16 enhanced Type II codebook (cf. Section 5.2.2.2.5, REF 8).

In one embodiment, a UE is configured with a CSI reporting based on a codebook which is one of the two codebooks described in one or more embodiments herein. In one example, this configuration can be via a higher layer parameter CodeookMode.

One embodiment is a variation of one or more embodiments described herein, wherein the SD basis selection matrix is replaced with a SD port selection matrix. In one example, the codebook in this case can be configured via one higher layer parameter codebookType set to 'typeII-PortSelection-cjt-mode2-r18', or via two higher layer parameters codebookType set to 'typeII-PortSelection-cjt-r18" and codebookMode set to 'Mode2'.

In one example, $$v_{m_1^{(r,i)}, m_2^{(r,i)}}$$

is replaced with $v_{i_{1,l,r}d+i}$(cf. Rel.16 Type II codebook). For TRP r, the antenna ports per polarization are selected by the index $i_{1,1}=[i_{1,1,1} \ldots i_{1,1,N}]$, where $$i_{1,1,r} \in \left\{0, 1, \ldots, \left\lceil \frac{P_{CSI-RS,r}}{2d} \right\rceil \right\}.$$

In one example, $$v_{m_1^{(r,i)}, m_2^{(r,i)}}$$

is replaced with $v_{m^{(r,i)}}$ (cf. Rel.17 Type II codebook).

For TRP r,$K_{1,r}=2L_r$ ports are selected from $P_{CSI-RS}$, r ports based on $L_r$ vectors, $v_{m^{(r,i)}}$, i=0,1, . . . , $L_r-1$, which are identified by $$m = \left[m^{(1)} \ldots m^{(N)}\right]$$
$$m^{(r)} = \left[m^{(r,0)} \ldots m^{(r,L-1)}\right]$$
$$m^{(r,i)} \in \left\{0, 1, \ldots, \frac{P_{CSI-RS}}{2} - 1\right\}$$

which are indicated by the index $i_{1,2}=[i_{1,2,1} \ldots i_{1,2,N}]$, where $$i_{1,2,r} \in \left\{0, 1, \ldots, \binom{P_{CSI-RS,r}/2}{L_r} - 1\right\}.$$

One embodiment is a variation of one or more embodiments described herein, wherein the SD basis selection matrix is replaced with a SD port selection matrix. In one example, the codebook in this case can be configured via one higher layer parameter codebookType set to 'typeII-PortSelection-cjt-mode1-r18', or via two higher layer parameters codebookType set to 'typeII-PortSelection-cjt-r18' and codebookMode set to 'Mode1'.

In one example, $$v_{m_1^{(r,i)}, m_2^{(r,i)}}$$

is replaced with $v_{i_{1,1,r}d+i}$ (cf. Rel.16 Type II codebook). For TRP r, the antenna ports per polarization are selected by the index $i_{1,1}=[i_{1,1,1} \ldots i_{1,1,N}]$, where $$i_{1,1,r} \in \left\{0, 1, \ldots, \left\lceil \frac{P_{CSI-RS,r}}{2d} \right\rceil \right\}.$$

In one example, $$v_{m_1^{(r,i)}, m_2^{(r,i)}}$$

is replaced with $v_{m^{(r,i)}}$ (cf. Rel.17 Type II codebook).

For TRP r,$K_{1,r}=2L_r$ ports are selected from $P_{CSI-RS}$, r ports based on $L_r$ vectors, $v_{m^{(r,i)}}$, i=0,1, . . . , $L_r-1$, which are identified by $$m = \left[m^{(1)} \ldots m^{(N)}\right]$$
$$m^{(r)} = \left[m^{(r,0)} \ldots m^{(r,L-1)}\right]$$
$$m^{(r,i)} \in \left\{0, 1, \ldots, \frac{P_{CSI-RS}}{2} - 1\right\}$$

which are indicated by the index $i_{1,2}=[i_{1,2} \ldots i_{1,2,N}]$, where $$i_{1,2,r} \in \left\{0, 1, \ldots, \binom{P_{CSI-RS,r}/2}{L_r} - 1\right\}.$$

One embodiment is a variation of one or more embodiments described herein, wherein the SD basis selection matrix is replaced with a SD port selection matrix.

In one example, $$v_{m_1^{(r,i)}, m_2^{(r,i)}}$$

is replaced with $v_{i_{1,1,r}d+i}$ (cf. Rel.16 Type II codebook). For TRP r, the antenna ports per polarization are selected by the index $i_{1,1}=[i_{1,1,1} \ldots i_{1,1,N}]$, where $$i_{1,1,r} \in \left\{0, 1, \ldots, \left\lceil \frac{P_{CSI-RS,r}}{2d} \right\rceil \right\}.$$

In one example, $$v_{m_1^{(r,i)}, m_2^{(r,i)}}$$

is replaced with $v_{m^{(r,i)}}$ (cf. Rel.17 Type II codebook).

For TRP r, $K_{1,r}=2L_r$ ports are selected from $P_{CSI\text{-}RS}$, r ports based on $L_r$ vectors, $v_{m^{(r,i)}}=0,1, \ldots, L_r-1$, which are identified by $$m = \left[m^{(1)} \ldots m^{(N)}\right]$$

$$m^{(r)} = \left[m^{(r,0)} \ldots m^{(r,L-1)}\right]$$

$$m^{(r,i)} \in \left\{0, 1, \ldots, \frac{P_{CSI\text{-}RS}}{2} - 1\right\}$$

which are indicated by the index $i_{1,2}=[i_{1,2,1} \ldots i_{1,2,N}]$, where $$i_{1,2,r} \in \left\{0, 1, \ldots, \binom{P_{CSI\text{-}RS,r}/2}{L_r} - 1\right\}.$$

The UE indicates the number of supported simultaneous CSI calculations $N_{CPU}$ with parameter simultaneousCSI-ReportsPerCC in a component carrier, and simultaneous-CSI-ReportsAllCC across each of the component carriers. If a UE supports $N_{CPU}$ simultaneous CSI calculations it is said to have $N_{CPU}$ CSI processing units for processing CSI reports. If L CPUs are occupied for calculation of CSI reports in a given OFDM symbol, the UE has $N_{CPU}-L$ unoccupied CPUs. If N CSI reports start occupying their respective CPUs on the same OFDM symbol on which $N_{CPU}-L$ CPUs are unoccupied, where each CSI report n=0, . . . , N−1 corresponds to $$O_{CPU}^{(n)},$$

the UE is not required to update the N−M requested CSI reports with lowest priority (according to Clause 5.2.5 of [8]), where 0≤M≤N is the largest value such that $$\sum_{n=0}^{M-1} O_{CPU}^{(n)} \leq N_{CPU} - L$$

holds.

A UE (e.g., the UE 116) is not expected to be configured with an aperiodic CSI trigger state containing more than $N_{CPU}$ Reporting Settings. Processing of a CSI report occupies a number of CPUs for a number of symbols as follows:

- $O_{CPU}=0$ for a CSI report with CSI-ReportConfig with higher layer parameter reportQuantity set to 'none' and CSI-RS-ResourceSet with higher layer parameter trs-Info configured.
- $O_{CPU}=1$ for a CSI report with CSI-ReportConfig with higher layer parameter reportQuantity set to 'cri-RSRP', 'ssb-Index-RSRP', 'cri-SINR', 'ssb-Index-SINR', 'cri-RSRP-Index', 'ssb-Index-RSRP-Index', 'cri-SINR-Index', 'ssb-Index-SINR-Index' or 'none' (and CSI-RS-ResourceSet with higher layer parameter trs-Info not configured).
- For a CSI report with CSI-ReportConfig with higher layer parameter reportQuantity set to 'cri-RI-PMI-CQI', 'cri-RI-i1', 'cri-RI-i1-CQI', 'cri-RI-CQI', or 'cri-RI-LI-PMI-CQI':
  - If max{μPDCCH, μCSI-RS, μUL}≤3, and if a CSI report is aperiodically triggered without transmitting a PUSCH with either transport block or HARQ-ACK or both when L=0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU}=N_{CPU}$.
  - If a CSI-ReportConfig is configured with codebook-Type set to 'typeI-SinglePanel' and the corresponding CSI-RS Resource Set for channel measurement is configured with two Resource Groups and N Resource Pairs, $O_{CPU}=X \cdot N+M$, where X is the number of CPUs occupied by a pair of Codec Mode Requests (CMRs) subject to mTRP-CSI-numCPU-r17 and M is defined in clause 5.2.1.4.2 of [8].
  - Otherwise, $O_{CPU}=K_s$, where $K_S$ is the number of CSI-RS resources in the CSI-RS resource set for channel measurement.

For a CSI report with CSI-ReportConfig with higher layer parameter reportQuantity not set to 'none', the CPU(s) are occupied for a number of OFDM symbols as follows:

- A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the configured PUSCH/PUCCH carrying the report.
- An aperiodic CSI report occupies CPU(s) from the first symbol after the PDCCH triggering the CSI report until the last symbol of the scheduled PUSCH carrying the report. When the PDCCH reception includes two PDCCH candidates from two respective search space sets, as described in clause 10.1 of [11], for the purpose of determining the CPU occupation duration, the PDCCH candidate that ends later in time is used.
- An initial semi-persistent CSI report on PUSCH after the PDCCH trigger occupies CPU(s) from the first symbol after the PDCCH until the last symbol of the scheduled PUSCH carrying the report. When the PDCCH reception includes two PDCCH candidates from two respective search space sets, as described in clause 10.1 of [11], for the purpose of determining the CPU occupation duration, the PDCCH candidate that ends later in time is used.

For a CSI report with CSI-ReportConfig with higher layer parameter reportQuantity set to 'none' and CSI-RS-ResourceSet with higher layer parameter trs-Info not configured, the CPU(s) are occupied for a number of OFDM symbols as follows:

- A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for layer 1 reference signal received power (L1-RSRP) computation, until $$Z_3'$$

symbols after the last symbol of the latest one of the CSI-RS/SSB resource for channel measurement for L1-RSRP computation in each transmission occasion.

An aperiodic CSI report occupies CPU(s) from the first symbol after the PDCCH triggering the CSI report until the last symbol between $Z_3$ symbols after the first symbol after the PDCCH triggering the CSI report and $$Z_3'$$

symbols after the last symbol of the latest one of each CSI-RS/SSB resource for channel measurement for L1-RSRP computation, where $$(Z_3, Z_3')$$

are defined in the table 5.4-2 of [8].

In any slot, the UE is not expected to have more active CSI-RS ports or active CSI-RS resources in active BWPs than reported as capability. NZP CSI-RS resource is active in a duration of time defined as follows. For aperiodic CSI-RS, starting from the end of the PDCCH containing the request and ending at the end of the scheduled PUSCH containing the report associated with this aperiodic CSI-RS. When the PDCCH candidates are associated with a search space set configured with searchSpaceLinking, for the purpose of determining the NZP CSI-RS resource active duration, the PDCCH candidate that ends later in time among the two linked PDCCH candidates is used. For semi-persistent CSI-RS, starting from the end of when the activation command is applied, and ending at the end of when the deactivation command is applied. For periodic CSI-RS, starting when the periodic CSI-RS is configured by higher layer signalling, and ending when the periodic CSI-RS configuration is released. If a CSI-RS resource is referred N times by one or more CSI Reporting Settings, the CSI-RS resource and the CSI-RS ports within the CSI-RS resource are counted N times. For a CSI-RS Resource Set for channel measurement configured with two Resource Groups and N Resource Pairs, if a CSI-RS resource is referred X times by one of the M CSI-RS resources, where M is defined in clause 5.2.1.4.2 of [8], and/or one or two Resource Pairs, the CSI-RS resource and the CSI-RS ports within the CSI-RS resource are counted X times.

When the CSI request field on a DCI triggers a CSI report(s) on PUSCH, the UE shall provide a valid CSI report for the n-th triggered report:

If the first uplink symbol to carry the corresponding CSI report(s) including the effect of the timing advance, starts no earlier than at symbol $Z_{ref}$, and If the first uplink symbol to carry the n-th CSI report including the effect of the timing advance, starts no earlier than at symbol $Z'_{ref}(n)$, where $Z_{ref}$ is defined as the next uplink symbol with its CP starting $T_{proc,CSI}=(Z)(2048+144)\cdot\kappa 2^{-\mu}\cdot T_c+T_{switch}$ after the end of the last symbol of the PDCCH triggering the CSI report(s), and where $Z'_{ref}(n)$, is defined as the next uplink symbol with its CP starting $T'_{proc,CSI}=(Z)(2048+144)\cdot\kappa 2^{-\mu}\cdot T_c$ after the end of the last symbol in time of the latest of: aperiodic CSI-RS resource for channel measurements, aperiodic CSI-IM used for interference measurements, and aperiodic NZP CSI-RS for interference measurement when aperiodic CSI-RS is used for channel measurement for the n-th triggered CSI report and where $T_{switch}$ is defined in clause 6.4 of [8] and is applied only if $Z_1$ of table 5.4-1 of [8] is applied.

If the PUSCH indicated by the DCI is overlapping with another PUCCH or PUSCH, then the CSI report(s) are multiplexed following the procedure in clause 9.2.5 of [11] and clause 5.2.5 of [8] when applicable, otherwise the CSI report(s) are transmitted on the PUSCH indicated by the DCI.

When the CSI request field on a DCI triggers a CSI report(s) on PUSCH, if the first uplink symbol to carry the corresponding CSI report(s) including the effect of the timing advance starts earlier than at symbol $Z_{ref}$, the UE may ignore the scheduling DCI if no HARQ-ACK or transport block is multiplexed on the PUSCH.

When the CSI request field on a DCI triggers a CSI report(s) on PUSCH, if the first uplink symbol to carry the n-th CSI report including the effect of the timing advance starts earlier than at symbol $Z'_{ref}(n)$:

the UE may ignore the scheduling DCI if the number of triggered reports is one and no HARQ-ACK or transport block is multiplexed on the PUSCH.

Otherwise, the UE is not required to update the CSI for the n-th triggered CSI report.

When the PDCCH reception includes two PDCCH candidates from two respective search space sets, as described in clause 10.1 of [11], for the purpose of determining the last symbol of the PDCCH triggering the CSI report(s), the PDCCH candidate that ends later in time is used.

Z, Z' and μ are defined as:

$$Z = \max_{m=0,\ldots,M-1}(Z(m)) \text{ and } Z' = \max_{m=0,\ldots,M-1}(Z'(m)),$$

where M is the number of updated CSI report(s) according to Clause 5.2.1.6 of [8]. (Z(m), Z'(m)) corresponds to the m-th updated CSI report and is defined as:

$$(Z_1, Z_1')$$

of the table 5.4-1 of [8] if $\max\{\mu PDCCH, \cup_{CSI-RS}, \mu_{UL}\}\leq 3$ and if the CSI is triggered without a PUSCH with either transport block or HARQ-ACK or both when L=0 CPUs are occupied (according to Clause 5.2.1.6 of [8]) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $$(Z_1, Z_1')$$

of the table 5.4-2 of [8] if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $$(Z_1, Z_1')$$

of the table 5.4-2 of [8] if the CSI to be transmitted corresponds to wideband frequency-granularity where the reportQuantity is set to 'ssb-Index-SINR', 'cri-SINR', 'ssb-Index-SINR-Index', or 'cri-SINR-Index', or $$(Z_3, Z_3')$$

of the table 5.4-2 of [8] if reportQuantity is set to 'cri-RSRP', 'ssb-Index-RSRP', 'cri-RSRP-Index' or 'ssb-Index-RSRP-Index', where Xμ is according to UE reported capability beamReportTiming and $KB_1$ is according to UE reported capability beamSwitchTiming as defined in [12], or $$(Z_2, Z_2')$$

of table 5.4-2 of [8] otherwise.

μ of table 5.4-1 of [8] and table 5.4-2 of [8] corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and $\mu_{UL}$ corresponds to the subcarrier spacing of the PUSCH with which the CSI report is to be transmitted and $\mu_{CSI-RS}$ corresponds to the minimum subcarrier spacing of the aperiodic CSI-RS triggered by the DCI

TABLE 5.4-1 [8]

CSI computation delay requirement 1

| μ | $Z_1$ | $Z_1'$ |
|---|---|---|
| 0 | 10 | 8 |
| 1 | 13 | 11 |
| 2 | 25 | 21 |
| 3 | 43 | 36 |

TABLE 5.4-2 [8]

CSI computation delay requirement 2

| | $Z_1$ [symbols] | | $Z_2$ [symbols] | | $Z_3$ [symbols] | |
|---|---|---|---|---|---|---|
| μ | $Z_1$ | $Z_1'$ | $Z_2$ | $Z_2'$ | $Z_3$ | $Z_3'$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |
| 5 | 388 | 340 | 608 | 560 | min(388, X5 + KB3) | X5 |
| 6 | 776 | 680 | 1216 | 1120 | min(776, X6 + KB4) | X6 |

If the first uplink symbol in the PUSCH allocation for a transport block, including the DMRS, as defined by the slot offset $K_2$ and $K_{offset}$, if configured, and the start S and length L of the PUSCH allocation indicated by 'Time domain resource assignment' of the scheduling DCI and including the effect of the timing advance, is no earlier than at symbol $L_2$, where $L_2$ is defined as the next uplink symbol with its CP starting $T_{proc,2}=\max((N_2+d_{2,1}+d_2)(2048+144)\cdot\kappa 2^{-\mu}\cdot T_c+T_{ext}+T_{switch}, d_{2,2})$ after the end of the reception of the last symbol of the PDCCH carrying the DCI scheduling the PUSCH, then the UE (e.g., the UE 116) shall transmit the transport block. When the PDCCH reception includes two PDCCH candidates from two respective search space sets, as described in clause 10.1 of [11], for the purpose of determining the last symbol of the PDCCH carrying the DCI scheduling the PUSCH, the PDCCH candidate that ends later in time is used.

$N_2$ is based on μ of Table 6.4-1 of [8] and Table 6.4-2 of [8] for UE processing capability 1 and 2 respectively, where μ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and k is defined in clause 4.1 of [10].

For operation with shared spectrum channel access in FR1, $T_{ext}$ is calculated according to [10], otherwise $T_{ext}=0$.

If the first symbol of the PUSCH allocation consists of DMRS only, then $d_{2,1}=0$, otherwise $d_{2,1}=1$.

If the UE is configured with multiple active component carriers, the first uplink symbol in the PUSCH allocation further includes the effect of timing difference between component carriers as given in [TS 38.133].

If the scheduling DCI triggered a switch of BWP, $d_{2,2}$ equals to the switching time as defined in [TS 38.133], otherwise $d_{2,2}=0$.

If a PUSCH of a larger priority index would overlap with PUCCH of a smaller priority index, $d_2$ for the PUSCH of a larger priority is set as reported by the UE; otherwise $d_2=0$.

For a UE that supports capability 2 on a given cell, the processing time according to UE processing capability 2 is applied if the high layer parameter processingType2Enabled in PUSCH-ServingCellConfig is configured for the cell and set to 'enable'.

If the PUSCH indicated by the DCI is overlapping with one or more PUCCH channels, then the transport block is multiplexed following the procedure in clause 9.2.5 of [11], otherwise the transport block is transmitted on the PUSCH indicated by the DCI.

If uplink switching gap is triggered as defined in clause 6.1.6 of [8], $T_{switch}$ equals to the switching gap duration and for the UE configured with higher layer parameter uplinkTxSwitchingOption set to 'dualUL' for uplink carrier aggregation $\mu_{UL}=\min(\mu_{UL,carrier1}, \mu_{UL,carrier2})$, otherwise $T_{switch}=0$.

Otherwise, the UE may ignore the scheduling DCI.

The value of $T_{proc,2}$ is used both in the case of normal and extended cyclic prefix.

TABLE 6.4-1 [8]

PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |
| 5 | 144 |
| 6 | 288 |

TABLE 6.4-2 [8]

| PUSCH preparation time for PUSCH timing capability 2 | |
|---|---|
| μ | PUSCH preparation time $N_2$ [symbols] |
| 0 | 5 |
| 1 | 5.5 |
| 2 | 11 for frequency range 1 |

In another embodiment, if a CSI-ReportConfig is configured with codebookType set to, e.g., 'typeII-CJT-r18', 'typeII-CJT-PortSelection-r18', 'typeII-Doppler-r18', 'typeII-Doppler-PortSelection-r18', or other codebook (one of the codebooks for CJT type-II regular/port-selection or Doppler type-II regular/port-selection or CJT+Doppler type-II codebook), Z and Z' can be determined based on $Z_2$ and $Z'_2$ shown in the Table 5.4-2 [8]. Z and Z' can be according to at least one of the following examples.

In one example, $$(Z_2+14(K-1)m,\ Z_2'),$$

with $$(Z_2,\ Z_2')$$

of table 5.4-2, if the CSI report is configured with $N_4=1$, codebookType is set to 'typeII-Doppler-r18' or 'typeII-Doppler-PortSelection-r18' and the corresponding NZP-CSI-RS-ResourceSet for channel measurement is aperiodic with K CSI-RS resources.

In one example, $$(Z_2+w,\ Z_2'),$$

with $$(Z_2,\ Z_2')$$

of table 5.4-2, if the CSI report is configured with $N_4=1$, codebookType is set to 'typeII-Doppler-r18' or 'typeII-Doppler-PortSelection-r18' and the corresponding NZP-CSI-RS-ResourceSet for channel measurement is periodic or semi-persistent with a single CSI-RS resource.

In one example, $$(Z_2+14(K-1)m,\ Z_2')$$

or $$(Z_2+14(K-1)m+r,\ Z_2'+r),$$

according to UE reported capability, with $$(Z_2,\ Z_2')$$

of table 5.4-2, if the CSI report is configured with $N_4>1$, codebookType is set to 'typeII-Doppler-r18' and the corresponding NZP-CSI-RS-ResourceSet for channel measurement is aperiodic with K CSI-RS resources.

In one example, $$(Z_2+w,\ Z_2')$$

or $$(Z_2+w+r,\ Z_2'+r),$$

according to UE reported capability, with $$(Z_2,\ Z_2')$$

of table 5.4-2, if the CSI report is configured with $N_4>1$, codebookType is set to 'typeII-Doppler-r18' and the corresponding NZP-CSI-RS-ResourceSet for channel measurement is periodic or semi-persistent with a single CSI-RS resource.

In another embodiment, w in one or more embodiments described herein depends on p, where p is the periodicity of P/SP (periodic or semi-persistent) NZP CSI-RS resource. In this case, w can be denoted by w=f(p). In one example, d=p, where d is the value of DD/TD unit.

In one example, $w=f(p)=c(K_p-1)p$, where $K_p$ is a number of active resources for CPU counting (i.e., the value for number of P/SP-CSI-RS active resources for counting), where $K_p\in\{1,2,4\}$ is determined based on UE capability.

In one example, c=14. In one example, c=7. In one example, c=28. In one example, c=1, 2, 3, 4, 5, or 6 or another value.

Note that for given values of $c\geq 1$ and $K_p>1$, $w=f(p)=c(K_p-1)p$ depends on the value of p, periodicity of P/SP CSI-RS resource, and can have a large value when p is large.

In one example, the value of w can have a limit/threshold (or upper bound or max value) that it cannot exceed.

In one example, when $K_p$ is 2, the value of w is limited by a value of $T_1>0$, i.e., $w\leq T_1$. In one example, $w=f(p)=\min(c(K_p-1)p,\ T_1)=\min(cp,\ T_1)$.

In one example, when $K_p$ is 4, the value of w is limited by a value of $T_2>0$, i.e., $w\leq T_2$. In one example, $w=f(p)=\min(c(K_p-1)p,\ T_2)=\min(3cp,\ T_2)$.

In one example, $T_1=T_2=T$. In another example $T_1\neq T_2$. In one example, both $T_1=T_2$ and $T_1\neq T_2$ are feasible.

In one example, $T_i$ or T is determined based on a value from PUSCH scheduling trigger offset, (e.g., higher-layer parameter reportSlotOffsetList) where the PUSCH scheduling trigger offset value (in slot) can be selected from (or configured from) {0,1,2, . . . , maxOffset}. In one example, maxOffset=32, i.e., the maximum value of PUSCH scheduling trigger offset is maxOffset=32.

In one example, $T_i$ or T is determined based on the maximum value of PUSCH scheduling trigger offset, maxOffset. Note that the time where CSI reporting happens can be configured 0 to 32 slots from the time where DCI scheduling PUSCH is triggered. Hence, Z+w or Z+w+r according to one or more examples described herein should not exceed the maximum value of PUSCH scheduling trigger offset, i.e., 32 slots.

In one example, T (or $T_i$) can be given by T=a×maxOffset+b.

In one example, a=14 and b=0, i.e., T=14 maxOffset.

In one example, a=14 and b=−r, i.e., T=14 maxOffset−r, and r is a value shown in one or more examples described herein.

In one example, a=14 and b=$-Z_2$ with $Z_2$ of table 5.4-2, i.e., T=14 maxOffset$-Z_2$. In one example, this can be interpreted as $Z_2$ value for Rel-18 Type-II Doppler CSI codebook (according to one or more examples described herein) to be $Z_{2,Rel18\text{-}Doppler}$ min($Z_2$+w, 14×maxOffset).

In one example, a=14 and b=$-Z_2$−r with $Z_2$ of table 5.4-2 and r is a value shown in one or more examples described herein, i.e., T=14 maxOffset$-Z_2$−r. In one example, this can be interpreted as $Z_2$ value for Rel-18 Type-II Doppler CSI codebook (described in one or more examples herein) to be $Z_{2,Rel18\text{-}Doppler}$=min($Z_2$+w+r, 14×maxOffset).

In one example, a in one or more examples described herein is replaced by $$a = 14\frac{2^{\mu_1}}{2^{\mu_2}}$$

where $\mu_1$ and $\mu_2$ are subcarrier spacings of DL slot with DCI and UL slot with CSI report.

In one example, T (or $T_i$) can be given by T=a×(maxOffset−1)+b.

In one example, a=14 and b=0.

In one example, a=14 and b=−r, and r is a value according to one or more examples described herein.

In one example, a=14 and b=$-Z_2$ with $Z_2$ of table 5.4-2. In one example, this can be interpreted as $Z_2$ value for Rel-18 Type-II Doppler CSI codebook (described in one or more examples herein) to be $Z_{2,Rel18\text{-}Doppler}$=min($Z_2$+w, 14×(maxOffset−1)).

In one example, a=14 and b=$-Z_2$−r with $Z_2$ of table 5.4-2 and r is a value according to one or more examples described herein. In one example, this can be interpreted as $Z_2$ value for Rel-18 Type-II Doppler CSI codebook (described in one or more examples herein) to be $Z_{2,Rel18\text{-}Doppler}$=min($Z_2$+w+r, 14×(maxOffset−1)).

In one example, a in one or more examples described herein is replaced by $$a = 14\frac{2^{\mu_1}}{2^{\mu_2}}$$

where $\mu_1$ and $\mu_2$ are subcarrier spacings of DL slot with DCI and UL slot with CSI report.

In one example, T (or $T_i$) can be given by T=a×(maxOffset+1)+b.

In one example, a=14 and b=0.

In one example, a=14 and b=−r, and r is a value shown in one or more examples herein.

In one example, a=14 and b=$-Z_2$ with $Z_2$ of table 5.4-2. In one example, this can be interpreted as $Z_2$ value for Rel-18 Type-II Doppler CSI codebook (described in one or more examples herein) to be $Z_{2,Rel18\text{-}Doppler}$=min($Z_2$+w, 14×(maxOffset+1)).

In one example, a=14 and b=$-Z_2$−r with $Z_2$ of table 5.4-2 and r is a value according to one or more examples described herein. In one example, this can be interpreted as $Z_2$ value for Rel-18 Type-II Doppler CSI codebook (described in one or more examples herein) to be $Z_{2,Rel18\text{-}Doppler}$=min($Z_2$+w+r, 14×(maxOffset+1)).

In one example, a in one or more examples described herein is replaced by $$a = 14\frac{2^{\mu_1}}{2^{\mu_2}}$$

where $\mu_1$ and $\mu_2$ are subcarrier spacings of DL slot with DCI and UL slot with CSI report.

In another example, UE doesn't expect that Z/Z' value for Rel-18 Type-II Doppler CSI codebook (according to one or more examples described herein) is larger than 14×maxOffset symbols.

In one example, $Z_2$ value for Rel-18 Type-II Doppler CSI codebook (according to one or more examples described herein can be given by $Z_{2,Rel18\text{-}Doppler}$=min ($Z_2$+w, 14×maxOffset), with $Z_2$ of table 5.4-2.

In one example, $Z_2$ value for Rel-18 Type-II Doppler CSI codebook (according to one or more examples described herein) can be given by $Z_{2,Rel18\text{-}Doppler}$=min ($Z_2$+w+r, 14×maxOffset), with $Z_2$ of table 5.4-2.

In one example, $T_i$ or T for i∈{1,2} is determined based on a value from 14(K−1)m, where K∈{4,8,12} and m∈{1, 2}. In one example, K is a number of AP CSI-RS resources and d is the spacing between two consecutive AP CSI-RS resources according to one or more examples described herein.

In one example, the supported values of p can determined based on a value from 14(K−1)m, where K∈{4,8,12} and m∈{1,2}. In one example, when c=14, the supported values of p can be as shown in the following table.

TABLE 1

| K | m | 14(K − 1)m | $K_p$ | p |
|---|---|---|---|---|
| 4 | 1 | 42 | 1 | Any p or N/A |
| | | | 2 | $p \le \frac{42}{14} = 3$ |
| | | | 4 | $p \le \frac{42}{42} = 1$ |
| 4 | 2 | 84 | 1 | Any p or N/A |
| | | | 2 | $p \le \frac{84}{14} = 6$ |
| | | | 4 | $p \le \frac{84}{42} = 2$ |

TABLE 1-continued

| K | m | 14(K − 1)m | $K_p$ | p |
|---|---|---|---|---|
| 8 | 1 | 98 | 1 | Any p or N/A |
| | | | 2 | $p \le \frac{98}{14} = 7$ |
| | | | 4 | $p \le \frac{98}{42} = \frac{7}{3}$ |
| 8 | 2 | 196 | 1 | Any p or N/A |
| | | | 2 | $p \le \frac{196}{14} = 14$ |
| | | | 4 | $p \le \frac{196}{42} = \frac{14}{3}$ |
| 12 | 1 | 154 | 1 | Any p or N/A |
| | | | 2 | $p \le \frac{154}{14} = 11$ |
| | | | 4 | $p \le \frac{154}{42} = \frac{11}{3}$ |
| 12 | 2 | 308 | 1 | Any p or N/A |
| | | | 2 | $p \le \frac{308}{14} = 22$ |
| | | | 4 | $p \le \frac{308}{42} = \frac{22}{3}$ |

In one example, $T_1$ is the max value of 14(K−1)m, where K∈{4,8,12} and m∈{1,2}. That is, $T_1$=14(K−1)m=308 when K=12 and m=2.

In one example, $T_1$ is the max value of 14(K−1)m, where K∈{4,8} and m∈{1,2}. That is, $T_1$=14(K−1)m=196 when K=8 and m=2.

In one example, $T_1$ is the max value of 14(K−1)m, where K∈{4,8,12} and m∈{1}. That is, $T_1$=14(K−1)m=154 when K=12 and m=1.

In one example, $T_1$ is the max value of 14(K−1)m, where K∈{4,8} and m∈{1}. That is, $T_1$=14(K−1)m=98 when K=8 and m=1.

In one example, $T_1$=42, 84, 98, 196, 154, or, 308.

In one example, $T_2$ is the max value of 14(K−1)m, where K∈{4,8,12} and m∈{1,2}. That is, $T_2$=14(K−1)m=308 when K=12 and m=2.

In one example, $T_2$ is the max value of 14(K−1)m, where K∈{4,8} and m∈{1,2}. That is, $T_2$=14(K−1)m=196 when K=8 and m=2.

In one example, $T_2$ is the max value of 14(K−1)m, where K∈{4,8,12} and m∈{1}. That is, $T_2$=14(K−1)m=154 when K=12 and m=1.

In one example, $T_2$ is the max value of 14(K−1)m, where K∈{4,8} and m∈{1}. That is, $T_2$=14(K−1)m=98 when K=8 and m=1.

In one example, $T_2$=42, 84, 98, 196, 154, or, 308.

In one example, the supported values of p can determined based on a threshold value T. In one example, when c=14, the supported values of p can be as shown in the following table.

TABLE 2

| $K_p$ | p |
|---|---|
| 1 | Any p or N/A |
| 2 | $p \le \frac{T}{14}$ |
| 4 | $p \le \frac{T}{42}$ |

In one example, T is the max value of 14(K−1)m, where K∈{4,8,12} and m∈{1,2}, i.e. 308.

In one example, T is 42, 84, 98, 196, 154, or, 308.

In one example, T is fixed or configured or reported by the UE (e.g., UE capabilities).

In one example, w=f(p)=c$N_4$p, where $N_4$ is configured by higher-layer parameter N4. In one example, $N_4$∈{1,2,4,8}.

In one example, c=14. In one example, c=7. In one example, c=28. In one example, c=1, 2, 3, 4, 5, or 6 or another value.

Note that for given values of c≥1 and $N_4$≥1, w=f(p)=c$N_4$p depends on the value of p, periodicity of P/SP CSI-RS resource, and can have a large value when p is large.

In one example, the value of w can have a limit/threshold (or upper bound or max value) that it cannot exceed.

In one example, when $N_4$ is 1, the value of w is limited by a value of $T_1$>0. In one example, w=f(p)=min(cp, $T_1$)=min (cp, $T_1$).

In one example when $N_4$ is 2, the value of w is limited by a value of $T_2$>0. In one example, w=f(p)=min(2cp, $T_2$)=min (2cp, $T_2$).

In one example, when $N_4$ is 4, the value of w is limited by a value of $T_3$>0. In one example, w=f(p)=min(4cp, $T_3$)=min (4cp, $T_3$).

In one example, when $N_4$ is 8, the value of w is limited by a value of $T_4$>0. In one example, w=f(p)=min(8cp, $T_4$)=min (8cp, $T_4$).

In one example, $T_1=T_2=T_3=T_4$. In another example $T_1 \neq T_2 \neq T_3 \neq T_4$. In another example, some of $T_1$, $T_2$, $T_3$, $T_4$ are equivalent, and the others are not equivalent.

In one example, $T_1$ for i∈{1,2,3,4} is determined based on a value from 14(K−1)m, where K∈{4,8,12} and m∈{1,2}. In one example, K is a number of AP CSI-RS resources and m is the spacing between two consecutive AP CSI-RS resources according to one or more examples described herein.

In one example, the supported values of p can determined based on a value from 14(K−1)m, where K∈{4,8,12} and m∈{1,2}. In one example, when c=14, the supported values of p can be as shown in the following table.

TABLE 3

| K | m | 14(K − 1)m | $N_4$ | p |
|---|---|---|---|---|
| 4 | 1 | 42 | 1 | $p \le \frac{42}{14} = 3$ |
| | | | 2 | $p \le \frac{42}{28} = \frac{3}{2}$ |
| | | | 4 | $p \le \frac{42}{56} = \frac{3}{4}$ |
| | | | 8 | $p \le \frac{42}{108} = \frac{3}{8}$ |

TABLE 3-continued

| K | m | 14(K − 1)m | $N_4$ | p |
|---|---|---|---|---|
| 4 | 2 | 84 | 1 | $p \le \frac{84}{14} = 6$ |
| | | | 2 | $p \le \frac{84}{28} = 3$ |
| | | | 4 | $p \le \frac{84}{56} = \frac{3}{2}$ |
| | | | 8 | $p \le \frac{84}{108} = \frac{3}{4}$ |
| 8 | 1 | 98 | 1 | $p \le \frac{98}{14} = 7$ |
| | | | 2 | $p \le \frac{98}{28} = \frac{7}{2}$ |
| | | | 4 | $p \le \frac{98}{56} = \frac{7}{4}$ |
| | | | 8 | $p \le \frac{98}{108} = \frac{7}{8}$ |
| 8 | 2 | 196 | 1 | $p \le \frac{196}{14} = 14$ |
| | | | 2 | $p \le \frac{196}{28} = 7$ |
| | | | 4 | $p \le \frac{196}{56} = \frac{7}{2}$ |
| | | | 8 | $p \le \frac{196}{108} = \frac{7}{4}$ |
| 12 | 1 | 154 | 1 | $p \le \frac{154}{14} = 11$ |
| | | | 2 | $p \le \frac{154}{28} = \frac{11}{2}$ |
| | | | 4 | $p \le \frac{154}{56} = \frac{11}{4}$ |
| | | | 8 | $p \le \frac{154}{108} = \frac{11}{8}$ |
| 12 | 2 | 308 | 1 | $p \le \frac{308}{14} = 22$ |
| | | | 2 | $p \le \frac{308}{28} = 11$ |
| | | | 4 | $p \le \frac{308}{56} = \frac{11}{2}$ |
| | | | 8 | $p \le \frac{308}{108} = \frac{11}{4}$ |

In one example, $T_i$ is the max value of 14(K−1)m, where K∈{4,8,12} and m∈{1,2}. That is, $T_i$=14(K−1)m=308 when K=12 and m=2.

In one example, $T_i$ is the max value of 14(K−1)m, where K∈{4,8} and m∈{1,2}. That is, $T_i$=14(K−1)m=196 when K=8 and m=2.

In one example, $T_i$ is the max value of 14(K−1)m, where K∈{4,8,12} and m∈{1}. That is, $T_i$=14(K−1)m=154 when K=12 and m=1.

In one example, $T_i$ is the max value of 14(K−1)m, where K∈{4,8} and m∈{1}. That is, $T_i$=14(K−1)m=98 when K=8 and m=1.

In one example, $T_i$=42, 84, 98, 196, 154, or, 308.

In one example, the supported values of p can determined based on a threshold value T. In one example, when c=14, the supported values of p can be as shown in the following table.

TABLE 4

| $N_4$ | p |
|---|---|
| 1 | $p \le \frac{T}{14}$ |
| 2 | $p \le \frac{T}{28}$ |
| 4 | $p \le \frac{T}{56}$ |
| 8 | $p \le \frac{T}{108}$ |

In one example, T is the max value of 14(K−1)m, where K∈{4,8,12} and m∈{1,2}, i.e. 308.

In one example, T is 42, 84, 98, 196, 154, or, 308.

In one example, T is fixed or configured or reported by the UE (e.g., UE capabilities).

In one example, w=f(p)=c($N_4$−1)p, where $N_4$ is configured by higher-layer parameter N4. In one example, $N_4$∈{1,2,4,8}.

In one example, c=14. In one example, c=7. In one example, c=28. In one example, c=1, 2, 3, 4, 5, or 6 or another value.

Note that for given values of c≥1 and $N_4$>1, w=f(p)=c($N_4$−1)p depends on the value of p, periodicity of P/SP CSI-RS resource, and can have a large value when p is large.

In one example, the value of w can have a limit number that cannot exceed.

In one example, when $N_4$ is 2, the value of w is limited by a value of $T_1$>0. In one example, w=f(p)=min(cp, $T_1$)=min (cp, $T_1$).

In one example, when $N_4$ is 4, the value of w is limited by a value of $T_2$>0. In one example, w=f(p)=min(3cp, $T_2$)=min (3cp, $T_2$).

In one example, when $N_4$ is 8, the value of w is limited by a value of $T_3$>0. In one example, w=f(p)=min(7cp, $T_3$)=min (7cp, $T_3$).

In one example, $T_1$=$T_2$=$T_3$. In another example $T_1$≠$T_2$≠$T_3$. In another example, some of $T_1$, $T_2$, $T_3$ are equivalent, and the others are not equivalent.

In one example, $T_i$ for i∈{1,2,3,4} is determined based on a value from 14(K−1)m, where K∈{4,8,12} and m∈{1,2}. In one example, K is a number of AP CSI-RS resources and m is the spacing between two consecutive AP CSI-RS resources according to one or more examples described herein.

In one example, the supported values of p can determined based on a value from 14(K−1)m, where K∈{4,8,12} and m∈{1,2}. In one example, when c=14, the supported values of p can be as shown in the following table.

TABLE 5

| K | m | 14(K − 1)m | $N_4$ | p |
|---|---|---|---|---|
| 4 | 1 | 42 | 1 | Any p or N/A |
| | | | 2 | $p \le \frac{42}{14} = 3$ |

TABLE 5-continued

| K | m | 14(K − 1)m | $N_4$ | p |
|---|---|---|---|---|
| | | | 4 | $p \le \frac{42}{42} = 1$ |
| | | | 8 | $p \le \frac{42}{98} = \frac{3}{7}$ |
| 4 | 2 | 84 | 1 | Any p or N/A |
| | | | 2 | $p \le \frac{84}{14} = 6$ |
| | | | 4 | $p \le \frac{84}{42} = 2$ |
| | | | 8 | $p \le \frac{84}{98} = \frac{6}{7}$ |
| 8 | 1 | 98 | 1 | Any p or N/A |
| | | | 2 | $p \le \frac{98}{14} = 7$ |
| | | | 4 | $p \le \frac{98}{42} = 7/3$ |
| | | | 8 | $p \le \frac{98}{98} = 1$ |
| 8 | 2 | 196 | 1 | Any p or N/A |
| | | | 2 | $p \le \frac{196}{14} = 14$ |
| | | | 4 | $p \le \frac{196}{42} = \frac{14}{3}$ |
| | | | 8 | $p \le \frac{196}{98} = 2$ |
| 12 | 1 | 154 | 1 | Any p or N/A |
| | | | 2 | $p \le \frac{154}{14} = 11$ |
| | | | 4 | $p \le \frac{154}{42} = \frac{11}{3}$ |
| | | | 8 | $p \le \frac{154}{98} = \frac{11}{7}$ |
| 12 | 2 | 308 | 1 | Any p or N/A |
| | | | 2 | $p \le \frac{308}{14} = 22$ |
| | | | 4 | $p \le \frac{308}{42} = \frac{22}{3}$ |
| | | | 8 | $p \le \frac{308}{98} = \frac{22}{7}$ |

In one example, $T_i$ is the max value of 14(K−1)m, where K∈{4,8,12} and m∈{1,2}. That is, $T_i$=14(K−1)m=308 when K=12 and m=2.

In one example, $T_i$ is the max value of 14(K−1)m, where K∈{4,8} and m∈{1,2}. That is, $T_i$=14(K−1)m=196 when K=8 and m=2.

In one example, $T_i$ is the max value of 14(K−1)m, where K∈{4,8,12} and m∈{1}. That is, $T_i$=14(K−1)m=154 when K=12 and m=1.

In one example, $T_i$ is the max value of 14(K−1)m, where K∈{4,8} and m∈{1}. That is, $T_i$=14(K−1)m=98 when K=8 and m=1.

In one example, $T_i$=42, 84, 98, 196, 154, or, 308.

In one example, the supported values of p can determined based on a threshold value T. In one example, when c=14, the supported values of p can be as shown in the following table.

TABLE 6

| $N_4$ | p |
|---|---|
| 1 | Any p or N/A |
| 2 | $p \le \frac{T}{14}$ |
| 4 | $p \le \frac{T}{42}$ |
| 8 | $p \le \frac{T}{98}$ |

In one example, T is the max value of 14(K−1)m, where K∈{4,8,12} and m∈{1,2}, i.e. 308.

In one example, T is 42, 84, 98, 196, 154, or, 308.

In one example, T is fixed or configured or reported by the UE (e.g., UE capabilities).

In one example, w=f(p)=cp, where c≥1. One or more examples described herein can be extended in the framework of w=f(p)=cp, by replacing c($K_p$−1) or c$N_4$ or 14($N_4$−1) with c.

In one example, the UE capability IE is via a separate/dedicated feature group (FG).

In one example, the UE capability IE is via a component of a FG comprising multiple components.

In one embodiment, r in one or more embodiments described herein depends on $N_4$. In this case, r can be denoted by r=f($N_4$).

In one example, r=f($N_4$)=c$N_4$.

In one example, c=14. In one example, c=7. In one example, c=28. In one example, c=1, 2, 3, 4, 5, or 6 or another value. In one example, $$c = \frac{1}{2}.$$

In one example, $$c = \frac{1}{3}.$$

In one example, $$c = \frac{1}{4}.$$

In one example, $$c = \frac{1}{8}.$$

In one example, $r=f(N_4)=xcN_4$, where x is a UE capability and the UE (e.g., the UE 116) reports its supported value of x.

In one example, c=14. In one example, c=7. In one example, c=28. In one example, c=1, 2, 3, 4, 5, or 6 or another value. In one example, $$c=\frac{1}{2}.$$

In one example, $$c=\frac{1}{3}.$$

In one example, $$c=\frac{1}{4}.$$

In one example, $$c=\frac{1}{8}.$$

In one example, $r=f(N_4)=c(N_4-1)$.

In one example, c=14. In one example, c=7. In one example, c=28. In one example, c=1, 2, 3, 4, 5, or 6 or another value. In one example, $$c=\frac{1}{2}.$$

In one example, $$c=\frac{1}{3}.$$

In one example, $$c=\frac{1}{4}.$$

In one example, $$c=\frac{1}{8}.$$

In one example, $r=f(N_4)=xc(N_4-1)$, where x is a UE capability and the UE reports its supported value of x.

In one example, c=14. In one example, c=7. In one example, c=28. In one example, c=1, 2, 3, 4, 5, or 6 or another value. In one example, $$c=\frac{1}{2}.$$

In one example, $$c=\frac{1}{3}.$$

In one example, $$c=\frac{1}{4}.$$

In one example, $$c=\frac{1}{8}.$$

In one example, $r=f(N_4)=c(\mu+1)N_4$, where μ is subcarrier spacing index.

In one example, c=14. In one example, c=7. In one example, c=28. In one example, c=1, 2, 3, 4, 5, or 6 or another value. In one example, $$c=\frac{1}{2}.$$

In one example, $$c=\frac{1}{3}.$$

In one example, $$c=\frac{1}{4}.$$

In one example, $$c=\frac{1}{8}.$$

In one example, $r=f(N_4)=xc(\mu+1)N_4$, where μ is subcarrier spacing index, x is a UE capability and the UE reports its supported value of x.

In one example, c=14. In one example, c=7. In one example, c=28. In one example, c=1, 2, 3, 4, 5, or 6 or another value. In one example, $$c=\frac{1}{2}.$$

In one example, $$c=\frac{1}{3}.$$

In one example, $$c = \frac{1}{4}.$$

In one example, $$c = \frac{1}{8}.$$

In one example, $r=f(N_4)=c(\mu+1)(N_4-1)$ where μ is subcarrier spacing index.

In one example, c=14. In one example, c=7. In one example, c=28. In one example, c=1, 2, 3, 4, 5, or 6 or another value. In one example, $$c = \frac{1}{2}.$$

In one example, $$c = \frac{1}{3}.$$

In one example, $$c = \frac{1}{4}.$$

In one example, $$c = \frac{1}{8}.$$

In one example, $r=f(N_4)=xc(\mu+1)(N_4-1)$ where μ is subcarrier spacing index, x is a UE capability and the UE reports its supported value of x.

In one example, c=14. In one example, c=7. In one example, c=28. In one example, c=1, 2, 3, 4, 5, or 6 or another value. In one example, $$c = \frac{1}{2}.$$

In one example, $$c = \frac{1}{3}.$$

In one example, $$c = \frac{1}{4}.$$

In one example, $$c = \frac{1}{8}.$$

Figure 19:
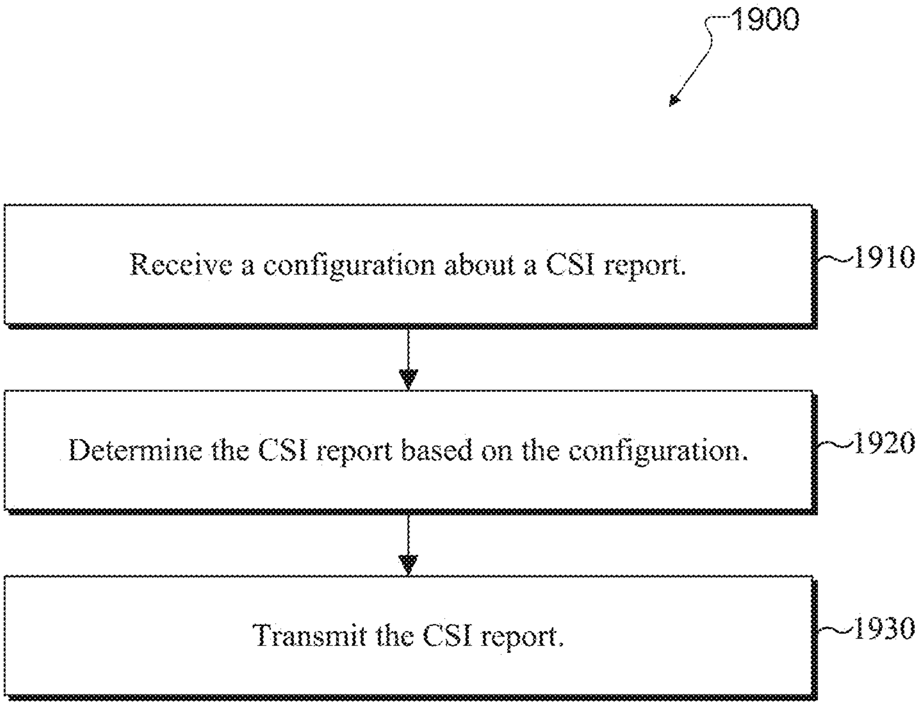
FIG. 19 illustrates an example method performed by a UE in a wireless communication system according to embodiments of the present disclosure.

FIG. 19 illustrates an example method 1900 performed by a UE in a wireless communication system according to embodiments of the present disclosure. The method 1900 of FIG. 19 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1900 is for illustration only and other embodiments can be used without departing from the scope of the present disclosure.

The method 1900 begins with the UE receiving a configuration about a CSI report (1910). The UE then determines the CSI report based on the configuration (1920). For example, in 1920, the CSI report starts no earlier than at a symbol Z and at a symbol Z'. The symbol Z is a next uplink symbol with a cyclic prefix (CP) starting $T_{proc,CSI}=Z(2048+144)\cdot\kappa 2^{-\mu}\cdot T_c$ after an end of a last symbol of a downlink control information (DCI) triggering the CSI report. The symbol Z' is a next uplink symbol with a CP starting $$T'_{proc,CSI} = Z(2048+144)\cdot\kappa 2^{-\mu}\cdot T_c$$

after an end of a last symbol in time of a latest of channel and interference measurements associated with the CSI report. (Z, Z') is $$(Z_2 + w,\ Z_2') \text{ or } (Z_2 + w + Z_2',\ 2Z_2')$$

according to a UE capability.

$$(Z_2, Z_2')$$

is according to a table w depends on p, which is a periodicity of a periodic or semi-persistent CSI-reference signal (RS) resource. The UE then transmits the CSI report (1930).

In various embodiments, w is determined from a function of $K_p$ and p, where $K_p$ is a number of active resources for CPU counting and $K_p\in\{1,2,4\}$ is determined based on another UE capability. In one example, $w=c(K_p-1)p$, where c is a constant. In various embodiments, a value of w selectable by the UE according to the UE capability is limited by a value of T. In one example, a value of T is determined based on a value of a scheduling trigger offset for a PUSCH. In various embodiments, w is determined from a function of $N_4$ and p, where $N_4\in\{1,2,4,8\}$ is a value configured by higher-layer parameter $N_4$. In one example, $w=cN_4p$, where c is a constant.

Any of the above variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:

a transceiver configured to receive a configuration about a channel state information (CSI) report; and a processor operably coupled to the transceiver, the processor, based on the configuration, configured to determine the CSI report, wherein the CSI report starts no earlier than at a symbol Z and at a symbol Z' and wherein:

the symbol Z is a next uplink symbol with a cyclic prefix (CP) starting $T_{proc,CSI}=Z(2048+144)\cdot\kappa2^{-\mu}\cdot T_c$ after an end of a last symbol of a downlink control information (DCI) triggering the CSI report; and the symbol Z' is a next uplink symbol with a CP starting $T'_{Proc,CSI}=Z(2048+144)\cdot\kappa2^{-\mu}\cdot T_c$ after an end of a last symbol in time of a latest of channel and interference measurements associated with the CSI report, where:

$T_c$ is a time unit,

κ is a constant,

μ is a subcarrier spacing configuration, (Z, Z') is $$(Z_2+w,\ Z_2')\text{ or }(Z_2+w+Z_2',\ 2Z_2')$$

according to a UE capability, $$(Z_2, Z_2')$$

is according to:

| | Z₂ [symbols] | |
|---|---|---|
| μ | $Z_2$ | $Z_2'$ |
| 0 | 40 | 37 |
| 1 | 72 | 69 |
| 2 | 141 | 140 |
| 3 | 152 | 140 |
| 5 | 608 | 560 |
| 6 | 1216 | 1120 |

w depends on p, and the p is a periodicity of a periodic or semi-persistent CSI-reference signal (RS) resource, and wherein the transceiver is further configured to transmit the CSI report.

2. The UE of claim 1, wherein w is determined from a function of $K_p$ and p, where $K_p$ is a number of active resources for CSI processing unit (CPU) counting and $K_p\in\{1,2,4\}$ is determined based on another UE capability.

3. The UE of claim 2, wherein $w=c(K_p-1)p$, where c is a constant.

4. The UE of claim 1, wherein a value of w selectable by the UE according to the UE capability is limited by a value of T.

5. The UE of claim 4, wherein a value of T is determined based on a value of a scheduling trigger offset for a physical uplink shared channel (PUSCH).

6. The UE of claim 1, wherein w is determined from a function of $N_4$ and p, where $N_4\in\{1,2,4,8\}$ is a value configured by higher-layer parameter $N_4$.

7. The UE of claim 6, wherein $w=cN_4p$, where c is a constant.

8. A base station (BS) comprising:

a processor; and a transceiver operably coupled to the processor, the transceiver configured to:

transmit a configuration about a channel state information (CSI) report; and receive the CSI report, wherein the CSI report starts no earlier than at a symbol Z and at a symbol Z' and wherein:

the symbol Z is a next uplink symbol with a cyclic prefix (CP) starting $T_{proc,CSI}=Z(2048+144)\cdot\kappa2^{-\mu}\cdot T_c$ after an end of a last symbol of a downlink control information (DCI) triggering the CSI report; and the symbol Z' is a next uplink symbol with a CP starting $$T'_{proc,CSI}=Z(2048+144)\cdot\kappa2^{-\mu}\cdot T_c$$

after an end of a last symbol in time of a latest of channel and interference measurements associated with the CSI report, where:

$T_c$ is a time unit,

κ is a constant,

μ is a subcarrier spacing configuration, (Z, Z') is $$(Z_2+w,\ Z_2')\text{ or }(Z_2+w+Z_2',\ 2Z_2')$$

according to a user equipment (UE) capability, $(Z_2, Z'_2)$ is according to:

| | Z₂ [symbols] | |
|---|---|---|
| μ | $Z_2$ | $Z_2'$ |
| 0 | 40 | 37 |
| 1 | 72 | 69 |
| 2 | 141 | 140 |
| 3 | 152 | 140 |
| 5 | 608 | 560 |
| 6 | 1216 | 1120 |

w depends on p, and the p is a periodicity of a periodic or semi-persistent CSI-reference signal (RS) resource.

9. The BS of claim 8, wherein w is based on a function of $K_p$ and p, where $K_p$ is a number of active resources for CSI processing unit (CPU) counting and $K_p\in\{1,2,4\}$ is determined based on another UE capability.

10. The BS of claim 9, wherein $w=c(K_p-1)p$, where c is a constant.

11. The BS of claim 8, wherein a value of w selectable by a UE according to the UE capability is limited by a value of T.

12. The BS of claim 8, wherein a value of T is based on a value of a scheduling trigger offset for a physical uplink shared channel (PUSCH).

13. The BS of claim 8, wherein w is based on a function of $N_4$ and p, where $N_4 \in \{1,2,4,8\}$ is a value configured by higher-layer parameter $N_4$.

14. The BS of claim 13, wherein $w=cN_4p$, where c is a constant.

15. A method performed by a user equipment (UE), the method comprising:

receiving a configuration about a channel state information (CSI) report;

based on the configuration, determining the CSI report, wherein the CSI report starts no earlier than at a symbol Z and at a symbol Z' and wherein:

the symbol Z is a next uplink symbol with a cyclic prefix (CP) starting $T_{proc,CSI}=Z(2048+144)\cdot\kappa 2^{-\mu}\cdot T_c$ after an end of a last symbol of a downlink control information (DCI) triggering the CSI report; and the symbol Z' is a next uplink symbol with a CP starting $$T'_{proc,CSI} = Z(2048+144)\cdot\kappa 2^{-\mu}\cdot T_c$$

after an end of a last symbol in time of a latest of channel and interference measurements associated with the CSI report, where:

$T_c$ is a time unit,

κ is a constant,

μ is a subcarrier spacing configuration, (Z, Z') is $$(Z_2+w, Z'_2) \text{ or } (Z_2+w+Z'_2, 2Z'_2)$$

according to a UE capability, $$(Z_2, Z'_2)$$

is according to:

| | Z₂ [symbols] | |
|---|---|---|
| μ | $Z_2$ | $Z'_2$ |
| 0 | 40 | 37 |
| 1 | 72 | 69 |
| 2 | 141 | 140 |
| 3 | 152 | 140 |
| 5 | 608 | 560 |
| 6 | 1216 | 1120 |

w depends on p, and the p is a periodicity of a periodic or semi-persistent CSI-reference signal (RS) resource; and transmitting the CSI report.

16. The method of claim 15, wherein w is determined from a function of $K_p$ and p, where $K_p$ is a number of active resources for CSI processing unit (CPU) counting and $K_p \in \{1,2,4\}$ is determined based on another UE capability.

17. The method of claim 16, wherein $w=c(K_p-1)p$, where c is a constant.

18. The method of claim 15, wherein a value of w selectable by the UE according to the UE capability is limited by a value of T.

19. The method of claim 18, wherein a value of T is determined based on a value of a scheduling trigger offset for a physical uplink shared channel (PUSCH).

20. The method of claim 15, wherein:

w is determined from a function of $N_4$ and p, where $N_4 \in \{1,2,4,8\}$ is a value configured by higher-layer parameter $N_4$; and $w=cN_4p$, where c is a constant.

* * * * *